(12) United States Patent
Takeda et al.

(10) Patent No.: US 11,054,845 B2
(45) Date of Patent: Jul. 6, 2021

(54) FLOW DIRECTION RESTRICTION VALVE MECHANISM AND VALVE DEVICE

(71) Applicant: NERIKI VALVE CO., LTD., Hyogo (JP)

(72) Inventors: Masaru Takeda, Hyogo (JP); Akira Oi, Hyogo (JP)

(73) Assignee: NERIKI VALVE CO., LTD., Hyogo (JP)

( * ) Notice: Subject to any disclaimer, the term of this patent is extended or adjusted under 35 U.S.C. 154(b) by 239 days.

(21) Appl. No.: 15/391,252

(22) Filed: Dec. 27, 2016

(65) Prior Publication Data

US 2017/0108879 A1   Apr. 20, 2017

Related U.S. Application Data

(63) Continuation of application No. PCT/JP2015/066879, filed on Jun. 11, 2015.

(30) Foreign Application Priority Data

Jun. 30, 2014 (JP) .............................. JP2014-134880

(51) Int. Cl.
    *G05D 7/01* (2006.01)
    *F16K 17/30* (2006.01)
    (Continued)

(52) U.S. Cl.
    CPC .............. *G05D 7/014* (2013.01); *F16K 17/04* (2013.01); *F16K 17/30* (2013.01); *F17C 13/04* (2013.01);
    (Continued)

(58) Field of Classification Search
    CPC .......... F16K 1/305; F16K 1/307; F16K 17/04; F16K 17/048; G05D 7/0126;
    (Continued)

(56) References Cited

U.S. PATENT DOCUMENTS 3,022,797 A * 2/1962 Allin ..................... F16K 1/44
                                                137/599.16
4,020,863 A * 5/1977 Fabish ................... G05D 16/10
                                                137/116.5
(Continued)

FOREIGN PATENT DOCUMENTS

GB    2349200 A    10/2000
JP    S63-275866 A    11/1988
(Continued)

OTHER PUBLICATIONS

International Search Report issued in PCT/JP2015/066879, dated Sep. 8, 2015, with English translation (2 pages).
(Continued)

*Primary Examiner* — Robert K Arundale
*Assistant Examiner* — Richard K. Durden
(74) *Attorney, Agent, or Firm* — Nakanishi IP Associates, LLC

(57) ABSTRACT

A flow direction restriction valve mechanism unit includes a pressure decreasing valve assembly that is located to freely advance or retract in a combination valve cassette attached to an in-outlet secondary side flow path formed on the side of an outlet with respect to an intermediate transmission member in a flow path, and retracts by a pressure of gas; a first coil spring urging the pressure decreasing valve assembly in a retracting direction; a check valve that is located to be freely advance or retract with respect to the pressure decreasing valve assembly, and retracts by a pressure of the gas; and a second coil spring urging the check valve in an advancing direction. A gas induction passage is formed in which the gas flows and acts on the pressure decreasing valve assembly such that the pressure decreasing valve assembly moves in the advancing direction.

5 Claims, 26 Drawing Sheets

(51) Int. Cl.
    *F17C 13/04*     (2006.01)
    *G05D 16/10*     (2006.01)
    *F16K 1/30*     (2006.01)
    *F16K 17/04*     (2006.01)

(52) U.S. Cl.
CPC .............. *G05D 16/10* (2013.01); *F16K 1/305* (2013.01); *F16K 1/307* (2013.01); *F16K 17/048* (2013.01); *F17C 2201/0109* (2013.01); *F17C 2201/056* (2013.01); *F17C 2201/058* (2013.01); *F17C 2205/035* (2013.01); *F17C 2205/0329* (2013.01); *F17C 2205/0332* (2013.01); *F17C 2205/0335* (2013.01); *F17C 2205/0338* (2013.01); *F17C 2205/0385* (2013.01); *F17C 2205/0394* (2013.01); *F17C 2227/048* (2013.01); *Y10T 137/7794* (2015.04); *Y10T 137/7811* (2015.04)

(58) Field of Classification Search
CPC .... G05D 7/0133; G05D 16/10; G05D 16/103; G05D 16/106; G05D 7/014; Y10T 137/7792; Y10T 137/7794; Y10T 137/781; Y10T 137/7811; Y10T 137/7822; Y10T 137/7828; Y10T 137/7842; Y10T 137/7846; Y10T 137/86928; Y10T 137/86992
See application file for complete search history.

(56) References Cited

U.S. PATENT DOCUMENTS

| | | | | |
|---|---|---|---|---|
| 4,210,168 A | * | 7/1980 | Yonezawa | F16K 1/305 137/454.5 |
| 5,048,565 A | * | 9/1991 | Oi | F17C 13/04 137/614.19 |
| 5,307,834 A | * | 5/1994 | Tatarek-Gintowt | G05D 16/10 137/116.5 |
| 5,309,945 A | * | 5/1994 | Sakai | F16K 1/305 137/861 |
| 5,732,735 A | * | 3/1998 | Birch | F17C 5/06 137/505.11 |
| 5,738,145 A | * | 4/1998 | Daicho | F16K 1/305 137/878 |
| 2001/0045241 A1 | | 11/2001 | Takeda | |
| 2014/0312042 A1 | | 10/2014 | Larsen et al. | |

FOREIGN PATENT DOCUMENTS

| | | | |
|---|---|---|---|
| JP | 2002-049426 A | | 2/2002 |
| JP | 2002-049427 A | | 2/2002 |
| JP | 2009193312 A | * | 8/2009 |
| JP | 2014-095401 A | | 5/2014 |
| WO | 2006/011023 A1 | | 2/2006 |

OTHER PUBLICATIONS

Written Opinion of International Search Authority issued in PCT/JP2015/066879, dated Sep. 8, 2015 (4 pages).

Extended European Search Report issued in European Patent Application No. 15815864.2, dated Feb. 12, 2018 (9 pages).

Written Opinion of International Search Authority issued in PCT/JP2015/066879, dated Sep. 8, 2015, with English translation (8 pages).

Office Action issued in Indian Patent Application No. 201747002775 dated Jun. 25, 2019 (6 pages).

* cited by examiner

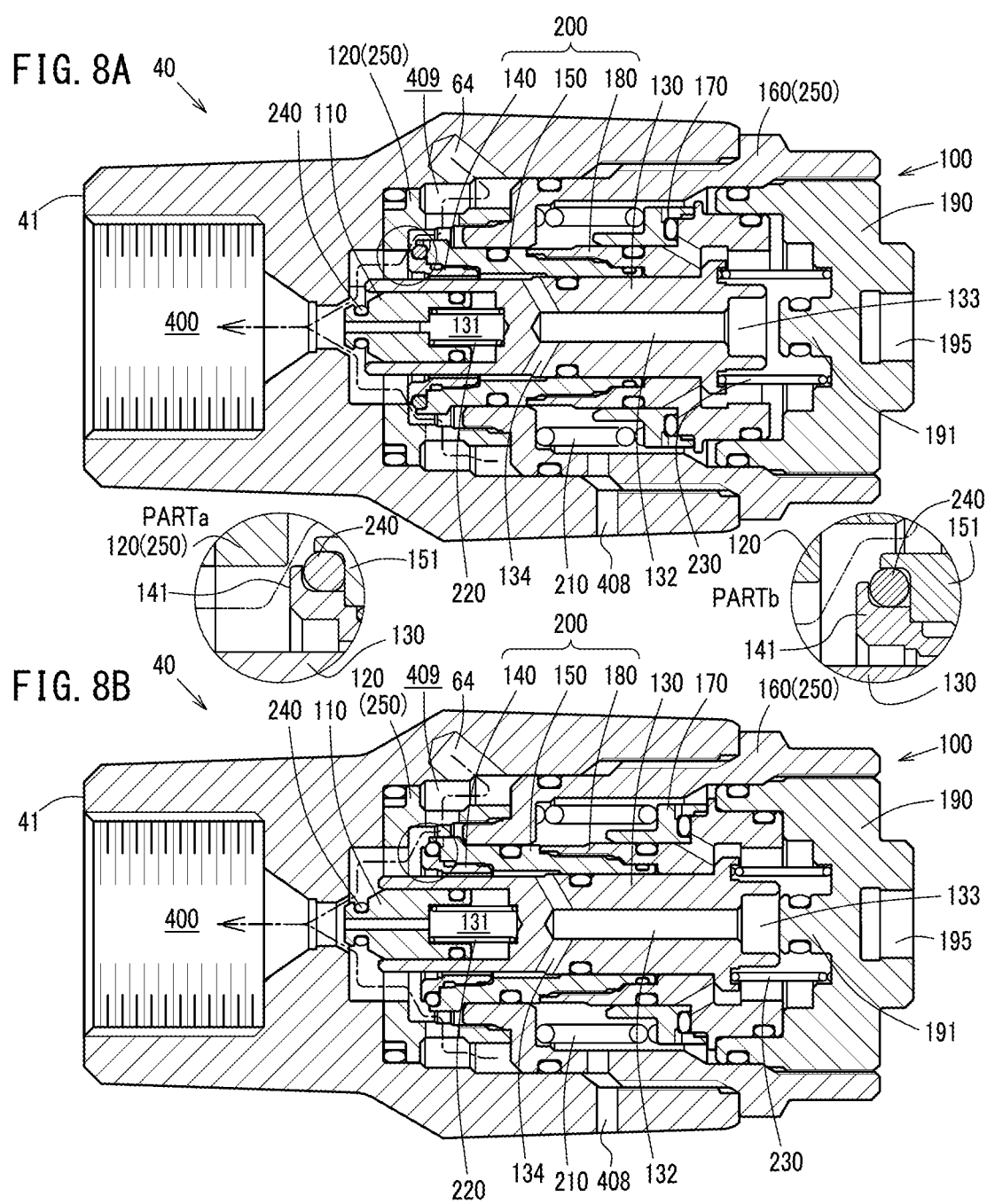

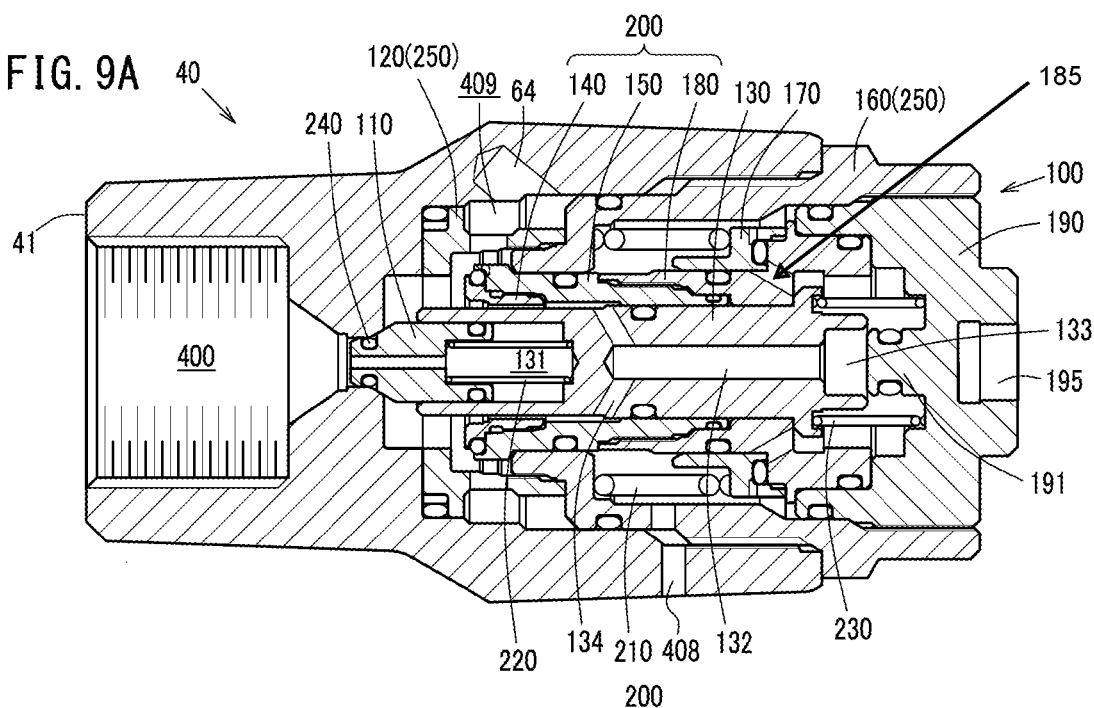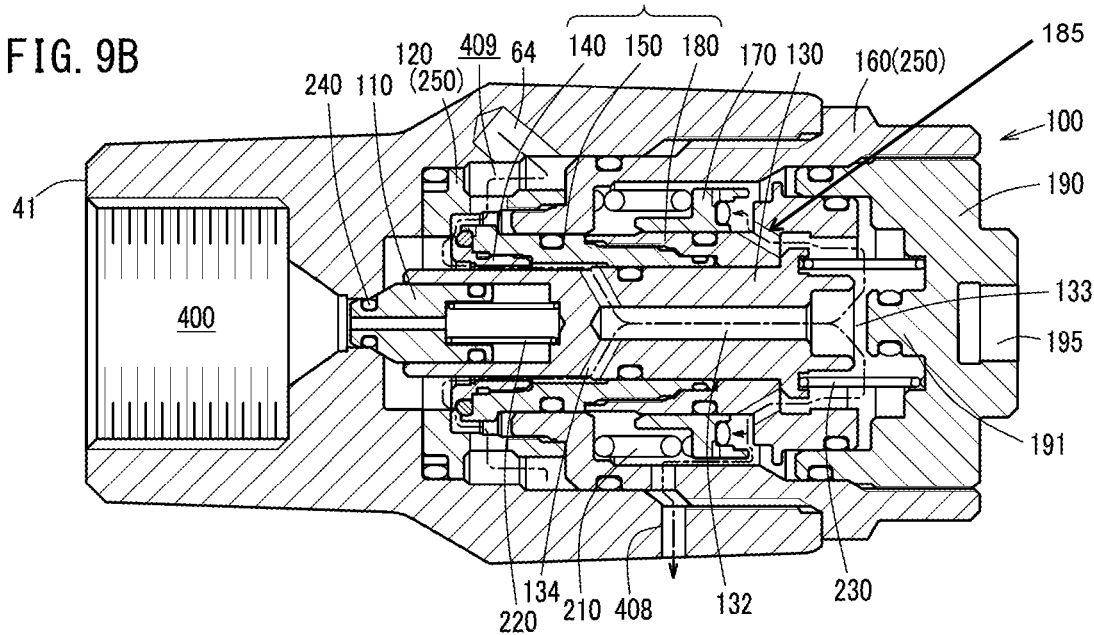

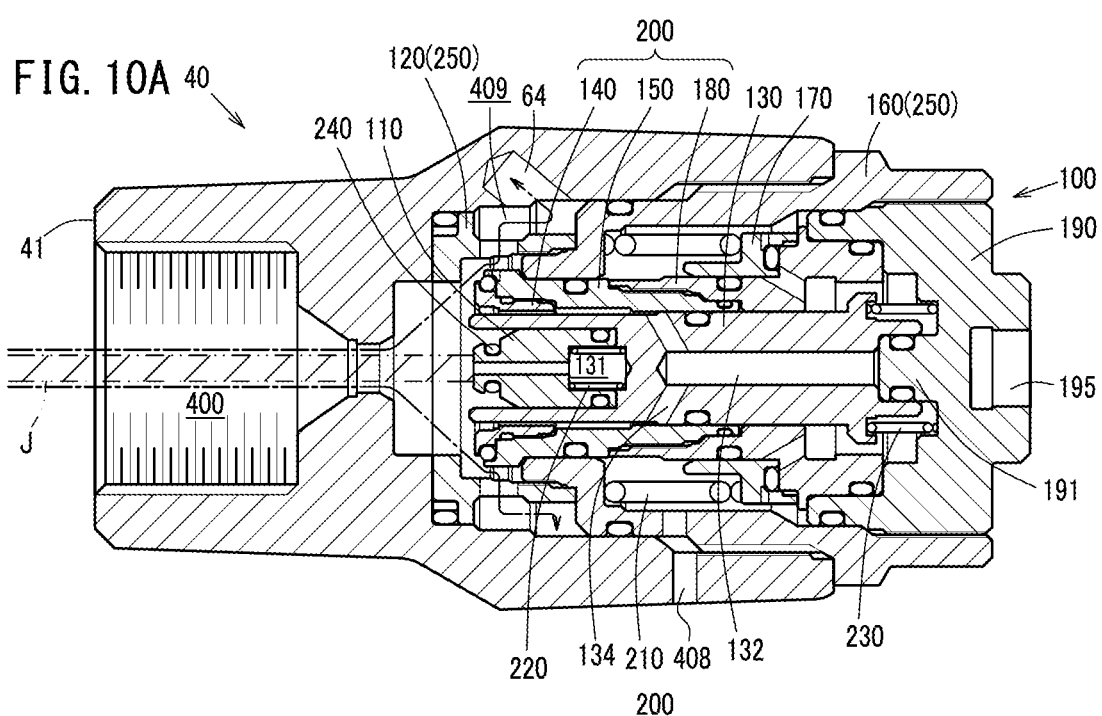
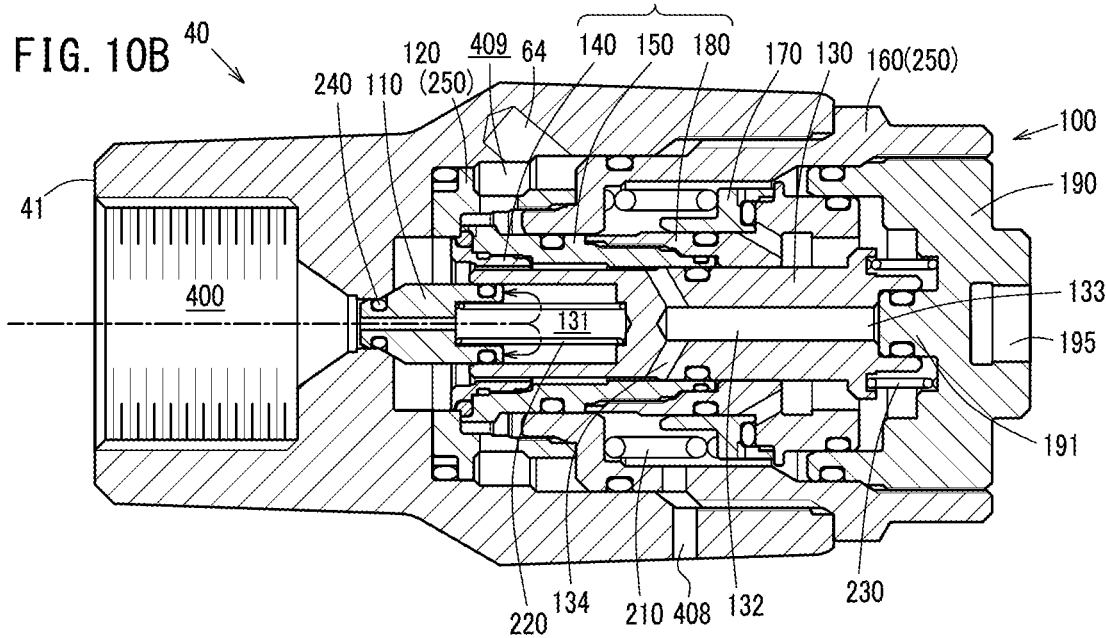

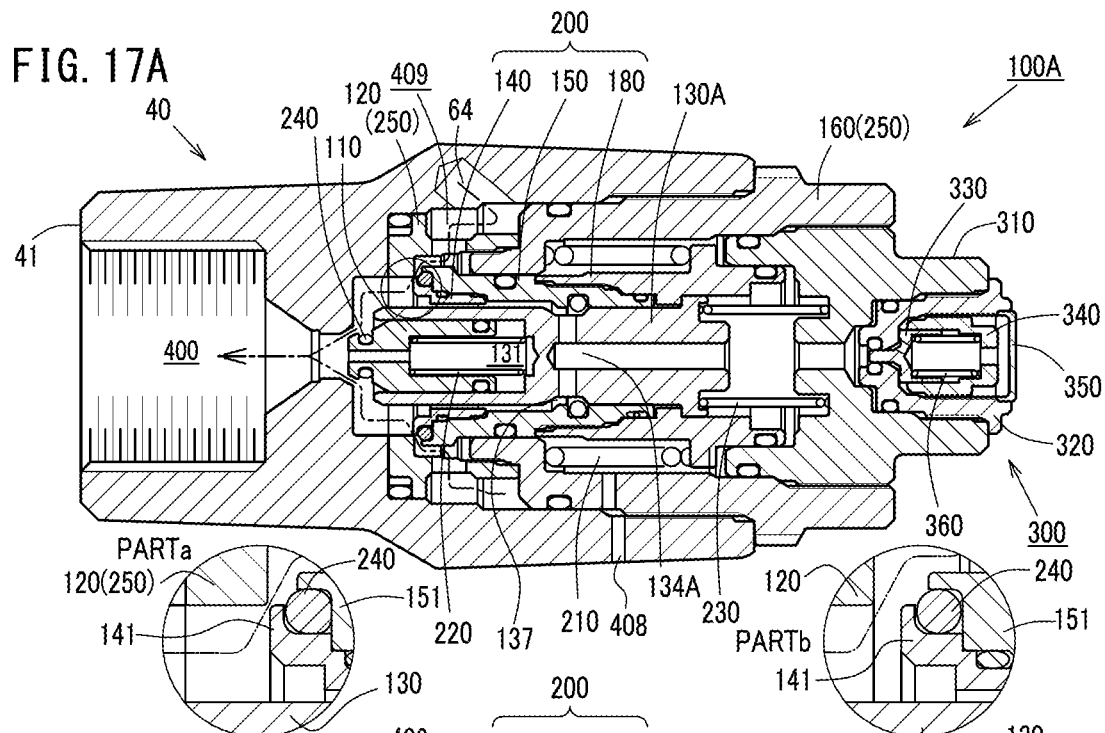
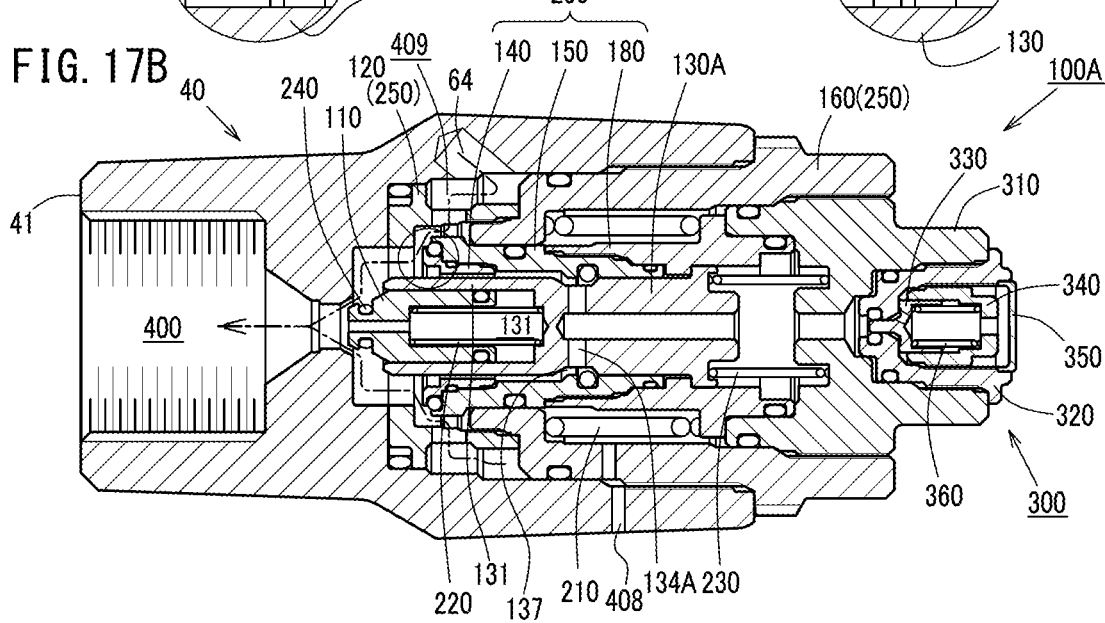

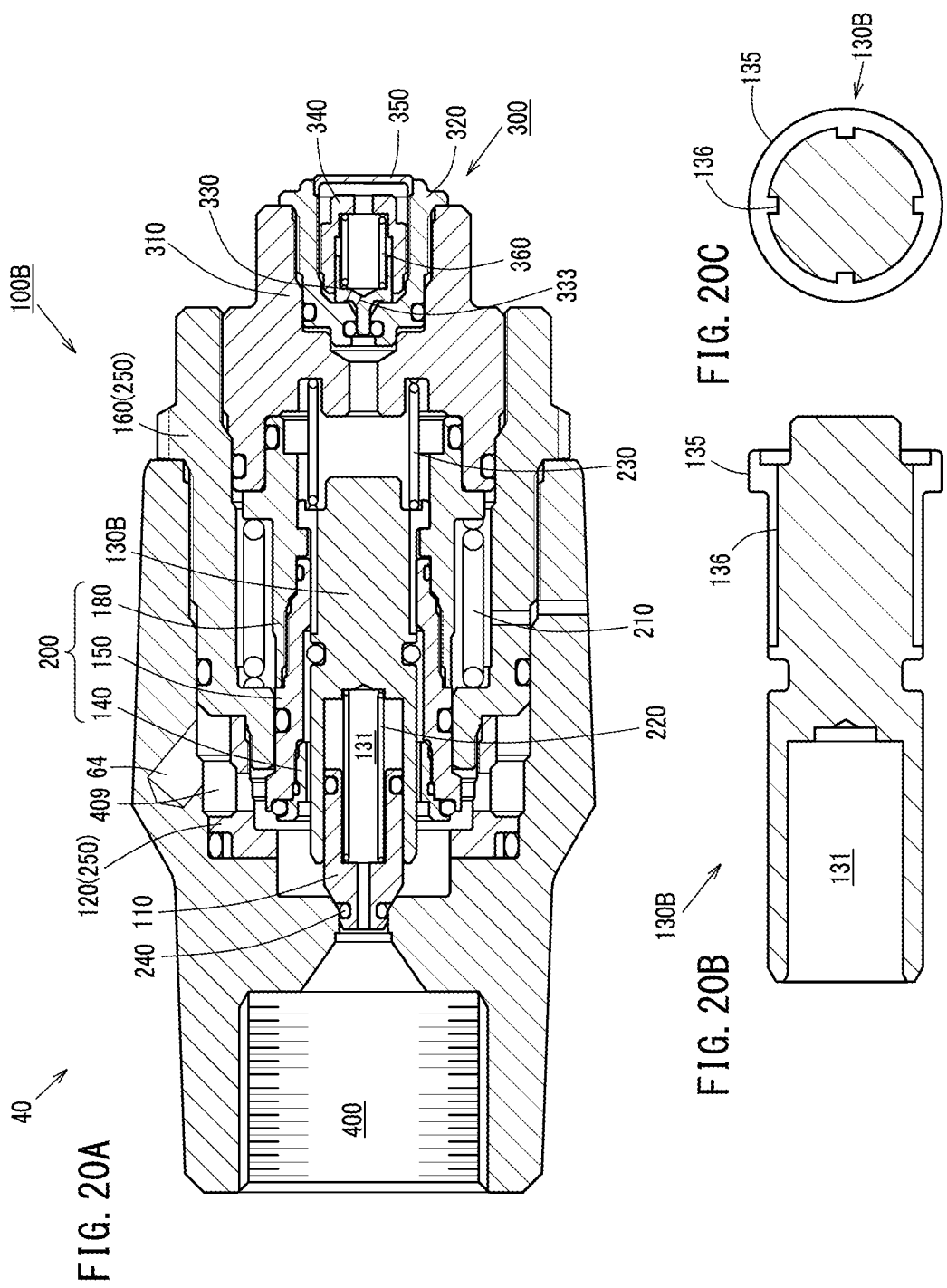

FLOW DIRECTION RESTRICTION VALVE MECHANISM AND VALVE DEVICE

CROSS-REFERENCE TO RELATED APPLICATIONS

This application is a continuation application of International Patent Application No. PCT/JP2015/066879 filed on Jun. 11, 2015, which claims priority to Japanese Patent Application No. 2014-134880 filed on Jun. 30, 2014, the entire contents of which are incorporated by reference.

TECHNICAL FIELD

The present invention relates to a flow direction restriction valve mechanism unit that, for example, allows gas of a predetermined pressure to remain in a storage container, such as a so-called residual pressure retaining valve mechanism or the like, and a valve device including such a flow direction restriction valve mechanism.

BACKGROUND ART

Generally in a valve device including an open/close valve that allows a fluid such as gas or the like to flow and also switches an open state to a sealed state or vice versa, a flow direction restriction valve mechanism may be occasionally provided. The flow direction restriction valve mechanism such as, for example, a so-called residual pressure retaining valve mechanism or the like, is different from the open/close valve, and restricts the flow direction of the fluid and allows gas of a predetermined pressure to remain in a storage container (see Patent Document 1).

As shown in Patent Document 1, such a flow direction restriction valve mechanism includes a valve that is located so as to freely advance or retract to a valve open position or a valve close position and retracts toward the valve open position by a pressure of the fluid flowing in a flow path. The flow direction restriction valve mechanism also includes O-rings located at a plurality of positions. The valve advances or retracts while the air-tightness is increased, and thus the flow direction of the fluid is restricted.

This will be described in more detail. The flow direction restriction valve mechanism described in Patent Document 1 operates as follows. Referring to FIG. 11, as represented by the one-dot chain line, when a pressure on a primary flow path side (hereinafter, referred to as a "primary side pressure") is decreased, a pressure on a secondary flow path side (hereinafter, referred to as a "secondary side pressure") is also decreased in proportion thereto, namely, at an equal ratio. When the primary side pressure reaches a predetermined level, the valve is moved to the valve close position to be closed and thus a fluid of the predetermined pressure remains in the container.

However, a container valve described in Patent Document 1 including a flow direction restriction valve mechanism having such a structure is of a low pressure close type, in which a pressure decreasing mechanism is closed when the pressure is low. Therefore, when the pressure in the container is decreased, the flow rate of the fluid is also decreased. Thus, a sufficient flow rate is not guaranteed.

CITATION LIST

Patent Literature

Patent Document 1: Japanese Laid-Open Patent Publication No. 2002-49427

SUMMARY OF INVENTION

Technical Problem

The present invention has an object of providing a compact valve device guaranteeing a sufficient flow rate even when the pressure in the container is close to a predetermined level at which the pressure is to be retained, and a flow direction restriction valve mechanism unit attachable to such a valve device.

Solution to Problem

The present invention is directed to a flow direction restriction valve mechanism unit attachable to a valve device including a flow path in which a fluid passes and an open/close valve switching an open state to a close state or vice versa at a middle portion of the flow path, the flow direction restriction valve mechanism unit being attachable to a restriction valve attachment space formed on the side of a fluid inlet/outlet portion with respect to the open/close valve in the flow path so as to prevent the fluid from flowing in an unintended direction. The flow direction restriction valve mechanism unit includes a first flow direction restriction valve that is located to be freely advance or retract to a first valve close position or a first valve open position in the restriction valve attachment space and retracts toward the first valve open position by a pressure of the fluid flowing in the flow path; a second flow direction restriction valve that is located to be freely advance or retract to a second valve close position or a second valve open position with respect to the first flow direction restriction valve and retracts toward the second valve open position by a pressure of the fluid flowing in the flow path; an acting gas flow path formed to cause the fluid of a predetermined pressure to flow to act on the first flow direction restriction valve such that the first flow direction restriction valve moves in an advancing direction from the first valve open position toward the first valve close position; a safety flow path that is connected with a middle part of the acting gas flow path and is in communication with the outside of the valve device; a safety valve located to be freely advance or retract to a third valve open position at which the acting gas flow path and the safety flow path are in communication with each other or to a third valve close position at which the acting gas flow path and the safety flow path are blocked against each other; a first urging portion having a spring force that urges the first flow direction restriction valve in a valve opening direction from the first valve close position toward the first valve open position and moves the first flow direction restriction valve from the first valve open position toward the first valve close position against the urging in the valve opening direction by a pressure, higher than, or equal to, a first predetermined pressure, of the fluid flowing in the acting gas flow path and acting on the first flow direction restriction valve; a second urging portion having a spring force that urges the second flow direction restriction valve in a valve closing direction from the second valve open position toward the second valve close position and moves the second flow direction restriction valve from the second valve close position toward the second valve open position against the urging in the valve closing direction by a pressure higher than, or equal to, a second predetermined pressure, which is lower than the first predetermined pressure; and a third urging portion having a spring force that urges the safety valve in a valve closing direction from the third valve open position toward the third valve close position and moves the safety valve from the third valve close position toward the third valve open position against the urging in the valve closing direction by a pressure higher than, or equal to, a third predetermined pressure, which is higher than the first predetermined pressure.

The present invention is directed to a valve device including a flow path in which a fluid passes; an open/close valve switching an open state to a close state or vice versa at a middle portion of the flow path; and a restriction valve attachment space to which a flow direction restriction valve mechanism having the above-described structure is attached to prevent the fluid from flowing in an unintended direction.

The fluid may be gas, liquid or gel.

The first urging portion, the second urging portion, or any other portion may act also as the third urging portion.

The acting gas flow path may be a combination of through-holes or the like formed in the components, may be formed of a flow path component provided therefor, or may be a combination of a through-hole formed in a component and a flow path component.

The valve device described above may be a valve device including a container attachment portion by which a valve main body is attachable to a storage container allowing a fluid to be stored therein, a fluid inlet/outlet portion allowing the fluid to flow in or flow out in the valve main body, a flow path that communicates the container attachment portion and the fluid inlet/outlet portion to each other and is open at both of two ends to allow the fluid to flow therein, and an open/close valve that switches an open state to a closed state or vice versa at a middle portion of the flow path, or a pipe valve attachable to a pipe.

The present invention provides a compact flow direction restriction valve mechanism unit guaranteeing that the fluid flows out at a sufficient flow rate even when the pressure of the fluid is close to a predetermined level at which the pressure is to be retained, and a valve check valve including a flow direction restriction valve mechanism.

This will be described in more detail. The flow direction restriction valve mechanism is attached to the restriction attachment space formed in the flow path, on the side of the fluid inlet/outlet portion with respect to the open/close valve. The flow direction restriction valve mechanism includes the first flow direction restriction valve, the first urging portion, the second flow direction restriction valve, and the second urging portion. In the flow direction restriction valve mechanism, the acting gas flow path is formed that causes the fluid of a predetermined pressure to flow to act on the first flow direction restriction valve such that the first flow direction restriction valve moves in the advancing direction from the first valve open position toward the first valve close position. With such an arrangement, if the primary side pressure is higher than, or equal to, a predetermined pressure, the fluid flows while the pressure thereof is adjusted by the first flow direction restriction valve by the balance of the pressure of the fluid flowing in the acting gas flow path and the spring force of the first urging portion. Therefore, the flow direction restriction valve mechanism acts as a pressure decreasing valve mechanism in which a secondary side pressure is made lower than the primary side pressure. Thus the fluid is allowed to flow in the state where the pressure thereof is decreased.

The first flow direction restriction valve retracts toward the first valve open position by the pressure of the fluid flowing in the flow path, and the first urging portion urges the first flow direction restriction valve in the retracting direction from the first valve close position toward the first valve open position. Therefore, the valve device of a low pressure open type is provided, in which the fluid flows in the acting gas flow path, the primary side pressure acting on the first flow direction restriction valve is decreased, and the first flow direction restriction valve is opened in a low pressure state having a predetermined low pressure. In such a low pressure state, the first flow direction restriction valve is decreased is opened, and thus a sufficient flow rate of the fluid is guaranteed to flow out.

The flow direction restriction valve mechanism includes the second flow direction restriction valve that is located to freely advance or retract to the second valve close position or the second valve open position with respect to the first flow direction restriction valve and retracts toward the second valve open position by the pressure of fluid flowing in the flow path; and the second urging portion that urges the second flow direction restriction valve in the advancing direction from the second valve open position toward the second valve close position. With such an arrangement, the fluid of a predetermined pressure is allowed to remain without the fluid filling the storage container being entirely released. Since the remaining pressure acts on the inside the storage container, an unintended flow of the fluid into the storage container is prevented. This maintains the storage container clean.

With the above-described structure, the flow direction restriction valve mechanism unit including the pressure decreasing mechanism and the residual pressure retaining mechanism, and the valve device including the flow direction restriction valve mechanism, is compact although being of a low pressure open type in which the first flow direction restriction valve is open in a low pressure state.

The first urging portion has a spring force that urges the first flow direction restriction valve in the valve opening direction from the first valve close position toward the first valve open position and moves the first flow direction restriction valve from the first valve open position toward the first valve close position against the urging in the valve opening direction by a pressure, higher than, or equal to, a first predetermined pressure, of the fluid flowing in the acting gas flow path and acting on the first flow direction restriction valve. The second urging portion has a spring force that urges the second flow direction restriction valve in the valve closing direction from the second valve open position toward the second valve close position and moves the second flow direction restriction valve from the second valve close position toward the second valve open position against the urging in the valve closing direction by a pressure higher than, or equal to, a second predetermined pressure, which is lower than the first predetermined pressure. With such an arrangement, the compact valve combination valve device is provided with certainty in which the pressure is decreased certainly in the case where the primary side pressure is high and a sufficient flow rate of fluid is guaranteed in a low pressure state.

The flow direction restriction valve mechanism includes a safety flow path connected with a middle part of the acting gas flow path and communicated with the outside of the flow direction restriction valve mechanism, the safety valve located to be freely advance or retract to the third valve close position at which the acting gas flow path and the safety flow path are in communication with each other or to the third valve close position at which the acting gas flow path and the safety flow path are blocked against each other, and the third urging portion having a spring force that urges the safety valve toward the third valve close position and allows the safety valve to be moved toward the third valve open position by the pressure of the fluid. The pressure of the fluid is higher than, or equal to, the third predetermined pressure. With such an arrangement, even when a fluid acted on by an excessive pressure exceeding the predetermined pressure flows, such a fluid acted on by the excessive pressure is released safely.

This will be described in more detail. When the safety valve is actuated by the action of the excessive pressure exceeding the predetermined pressure, a release path in the housing is opened to allow the fluid to flow therein. Therefore, the fluid acted on by the excessive pressure is released from the opening at the open end of the release path.

In an embodiment of the present invention, the first flow direction restriction valve, the second flow direction restriction valve and the safety valve may advance and retract coaxially.

According to the present invention, as compared with the case where the first flow direction restriction valve, the second flow direction restriction valve and the safety valve do not advance or retract coaxially, the flow direction restriction valve mechanism is made more compact.

In an embodiment of the present invention, the first urging portion may also act as the third urging portion.

According to the present invention, the number of the components is decreased. In addition, as compared with the case where the third urging portion and the first urging portion are separately provided, the required space is decreased, and the flow direction restriction valve mechanism is made more compact.

In an embodiment of the present invention, the flow direction restriction valve unit may further include a block unit that blocks the acting gas flow path by coaxial engagement to prevent the fluid from flowing in a filling direction.

According to the present invention, even in the case where the storage container is filled with a fluid of a high pressure that is higher than the pressure at which the safety valve is actuated, the acting gas flow path is blocked by the block unit that is coaxially engaged therewith. Therefore, the safety valve does not act unnecessarily, and the storage container is filled with the fluid with certainty. The pressure at which the safety valve is actuated is higher than the secondary side pressure P2, which is close to the pressure of use.

In the case where the block unit is not provided, the safety valve located in the acting as flow path is actuated by the filling pressure. Therefore, a route for providing a fluid to fill the storage container needs to be provided separately from the acting gas flow path. By contrast, according to the present invention, since the block unit that blocks the acting gas flow path is provided, the safety valve is not actuated by the filling pressure. Thus, one opening is usable as a fluid filling opening and a fluid releasing opening. Namely, filling with a fluid and fluid releasing are performed via one opening. Thus, the valve device is made compact.

The blocking is provided by engagement performed in the coaxial direction, which is the same direction with the acting direction of the other components. Therefore, the blocking is provided with certainty, and the flow direction restriction valve mechanism is made compact.

In an embodiment according to the present invention, the flow direction restriction valve unit may further include a cassette frame accommodating the first flow direction restriction valve, the first urging portion, the second flow direction restriction valve, the second urging portion, the safety valve, the third urging portion, the block unit, the acting gas flow path and the safety flow path, the cassette frame being attachable to the restriction valve attachment space.

According to the present invention, a composite valve device including the first flow direction restriction valve, the first urging portion, the second flow direction restriction valve, the second urging portion, the safety valve, the third urging portion, the block unit, the acting gas flow path and the safety flow path is provided easily.

This will be described in more detail. The cassette frame accommodating the first flow direction restriction valve, the first urging portion, the second flow direction restriction valve, the second urging portion, the safety valve, the third urging portion, the block unit, the acting gas flow path and the safety flow path is merely attached to the restriction valve attachment space, so that the composite valve device including the pressure decreasing valve mechanism, the residual pressure retaining mechanism, and the safety valve mechanism is provided.

The cassette frame accommodating the first flow direction restriction valve, the first urging portion, the second flow direction restriction valve, the second urging portion, the safety valve, the third urging portion, the block unit, the acting gas flow path and the safety flow path has a so-called cassette structure that is easily attachable to the valve device. Therefore, the ease of assembly is improved as compared with the case where the first flow direction restriction valve, the first urging portion, the second flow direction restriction valve, the second urging portion, the safety valve, the third urging portion, the block unit, the acting gas flow path and the safety flow path are separately assembled to the restriction valve attachment space.

The cassette frame accommodating the first flow direction restriction valve, the first urging portion, the second flow direction restriction valve, the second urging portion, the safety valve, the third urging portion, the block unit, the acting gas flow path and the safety flow path acts as the so-called pressure decreasing valve mechanism, the so-called residual pressure retaining mechanism, and the so-called safety valve mechanism even without being attached to the restriction valve attachment space. Performance tests on the so-called pressure decreasing valve mechanism, the so-called residual pressure retaining mechanism, and the so-called safety valve mechanism may be performed in the state where the cassette frame is not attached to the restriction valve attachment space.

In an embodiment according to the present invention, the flow direction restriction valve unit may further include an accommodating space on an advancing side with respect to the first flow direction restriction valve, the accommodating space being open on the advancing side and accommodating the second flow direction restriction valve such that the second flow direction restriction valve is allowed to freely advance or retract. The accommodating space may accommodate the second urging portion urging the second flow direction restriction valve toward the advancing side by use of the first flow direction restriction valve as a counterforce and also accommodates the second flow direction restriction valve.

According to the present invention, unlike in the case where the second flow direction restriction valve is separate from the first flow direction restriction valve, the second flow direction restriction valve and the second urging portion are accommodated in the accommodation space formed in the advancing-side part of the first flow direction restriction valve. Thus, the flow direction restriction valve mechanism is made more compact.

Advantageous Effects of Invention

The present invention provides a compact valve device guaranteeing a sufficient flow rate even when the pressure in the container is close to a predetermined level at which the pressure is to be retained, and a flow direction restriction valve mechanism unit attachable to such a valve device.

BRIEF DESCRIPTION OF DRAWINGS

FIGS. 8A and 8B show the combination valve cassette.

FIGS. 9A and 9B show the combination valve cassette.

FIGS. 10A and 10B show the combination valve cassette.

FIGS. 17A and 17B show the another combination valve cassette.

FIGS. 20A, 20B, and 20C provide enlarged cross-sectional views of still another combination valve cassette.

DESCRIPTION OF EMBODIMENTS

A container valve 1 in an embodiment according to the present invention will be described with reference to FIG. 1 through FIG. 11.

Figure 1:
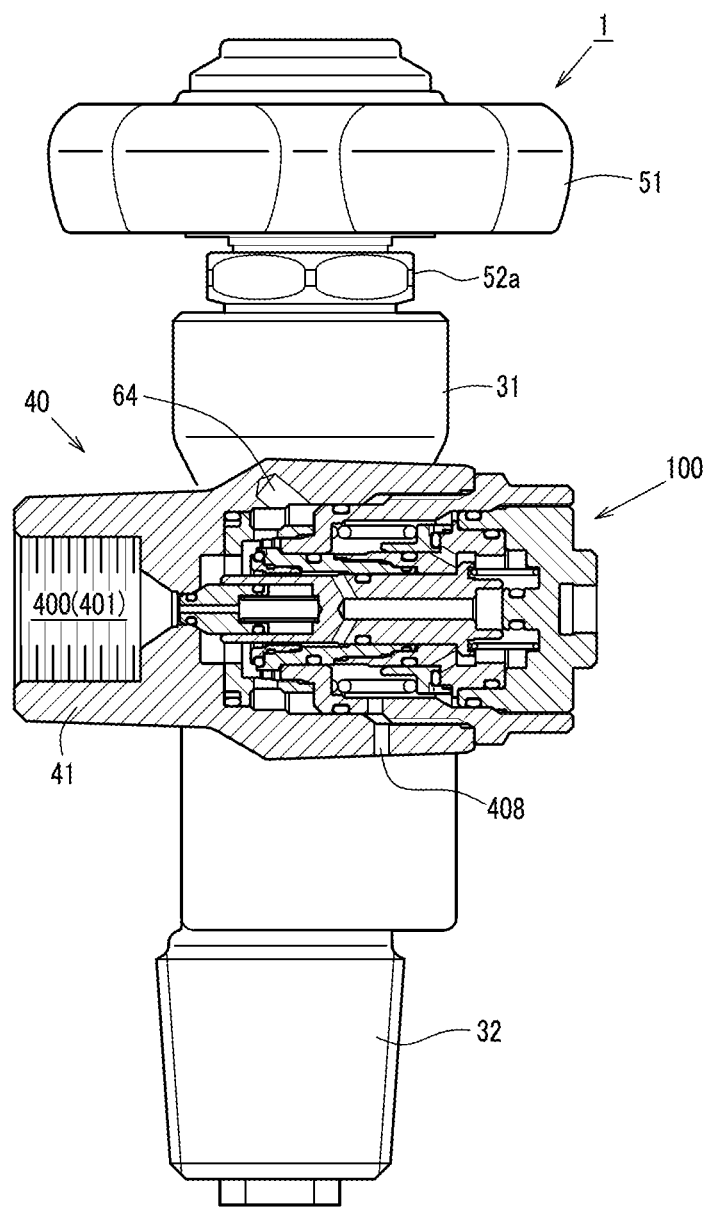
FIG. 1 is a cross-sectional view of a combination valve cassette in a container valve.
Figure 2:
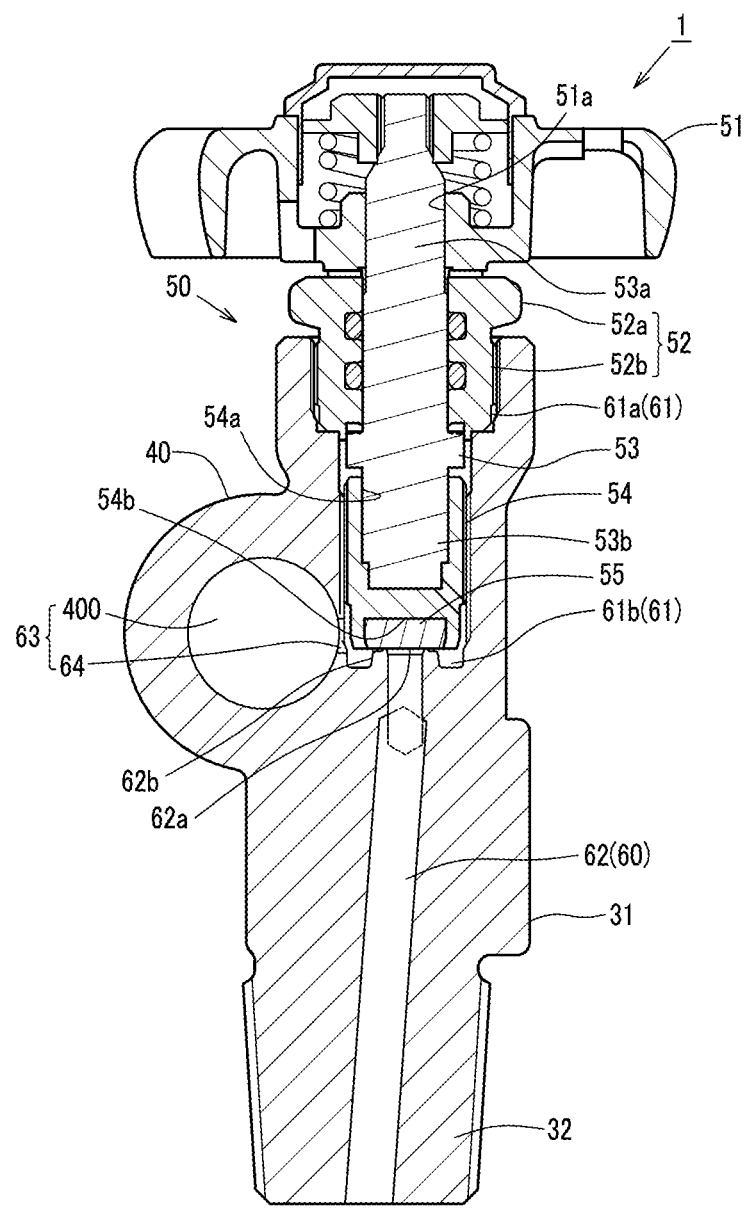
FIG. 2 is a cross-sectional view of the container valve.
Figure 3:
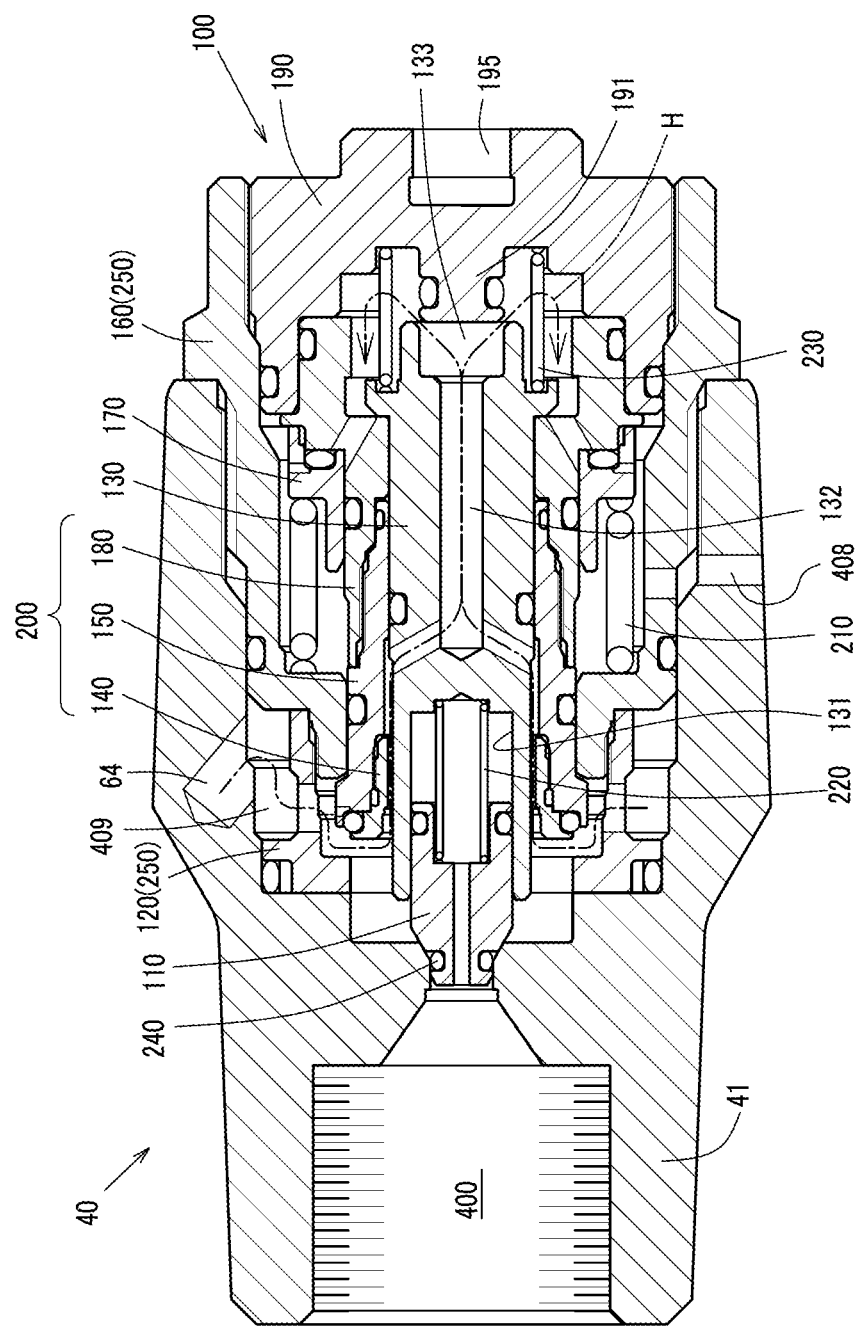
FIG. 3 shows the combination valve cassette.
Figure 4:
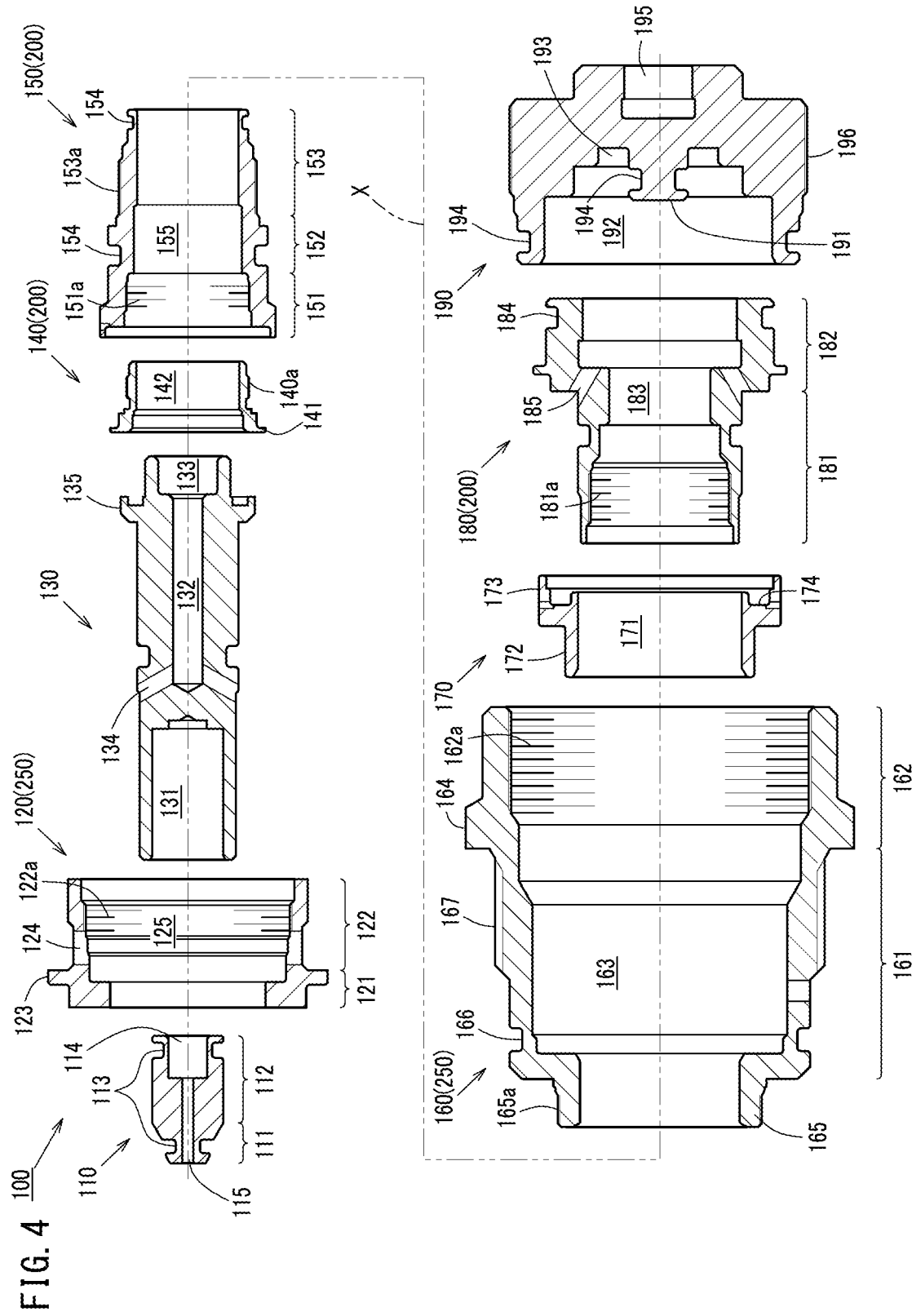
FIG. 4 is an exploded cross-sectional view of the combination valve cassette.
Figure 5:
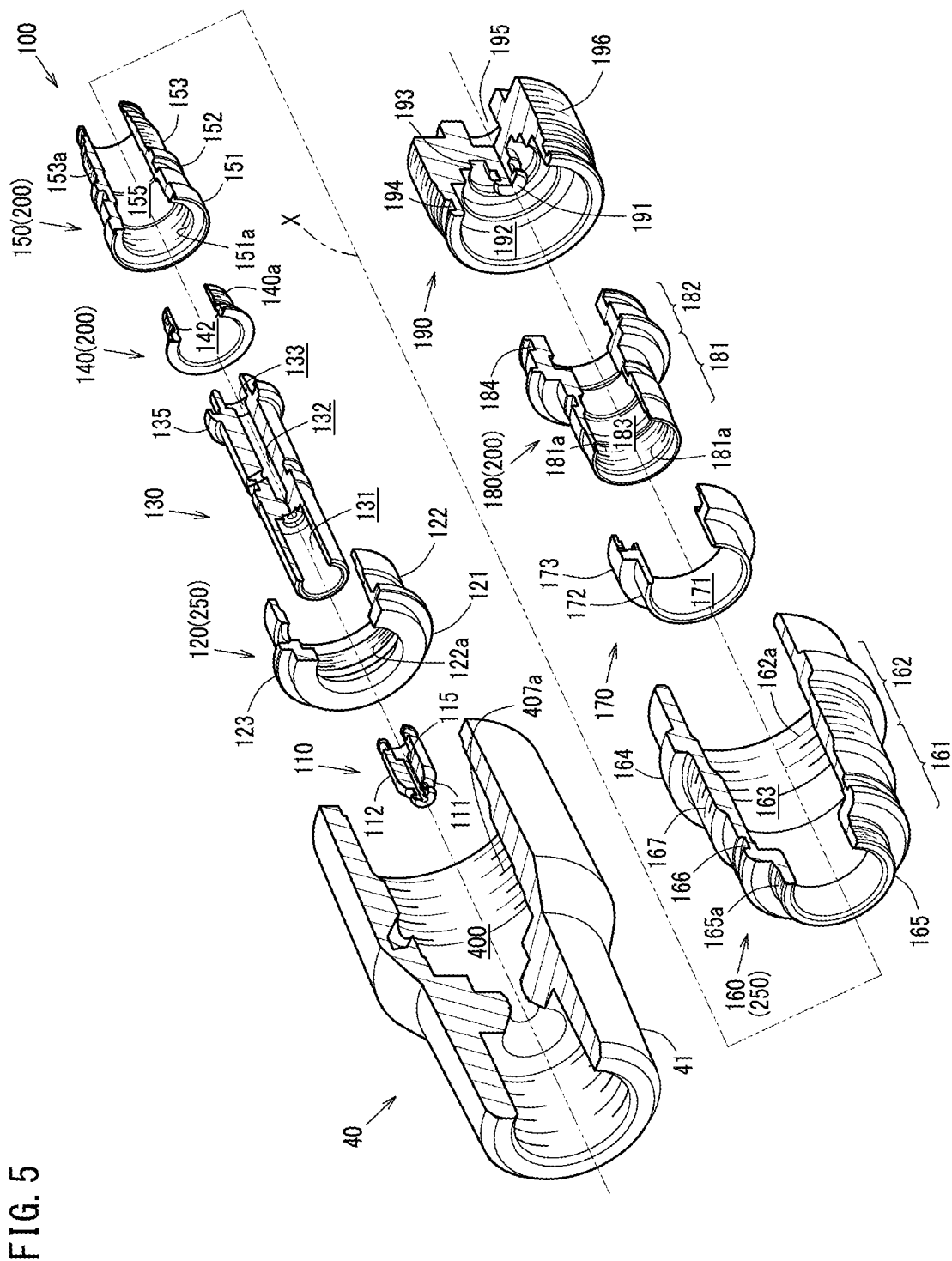
FIG. 5 is an exploded isometric view of the combination valve cassette.
Figure 6:
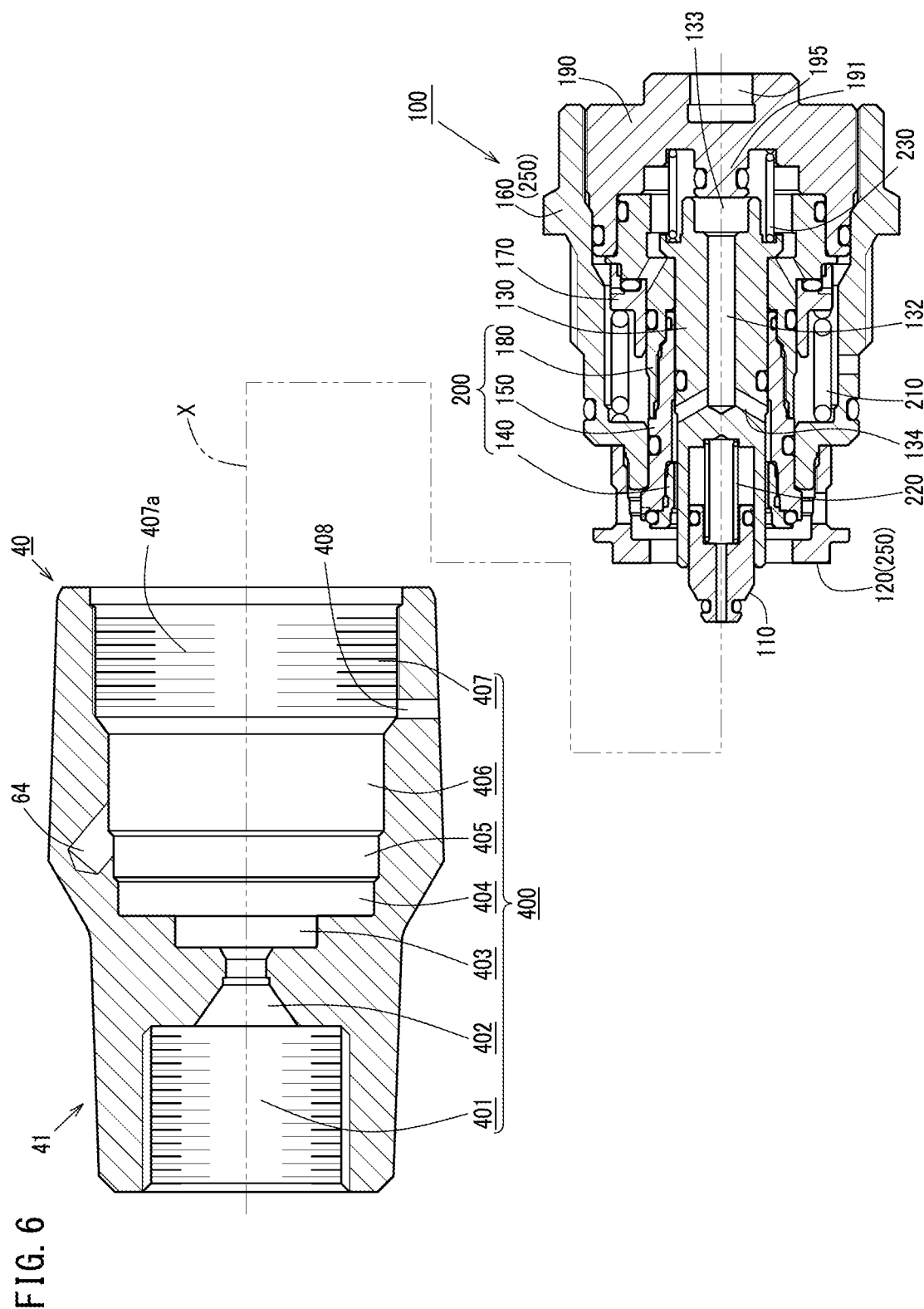
FIG. 6 is an enlarged cross-sectional view showing how the combination valve cassette is attached.
Figure 7:
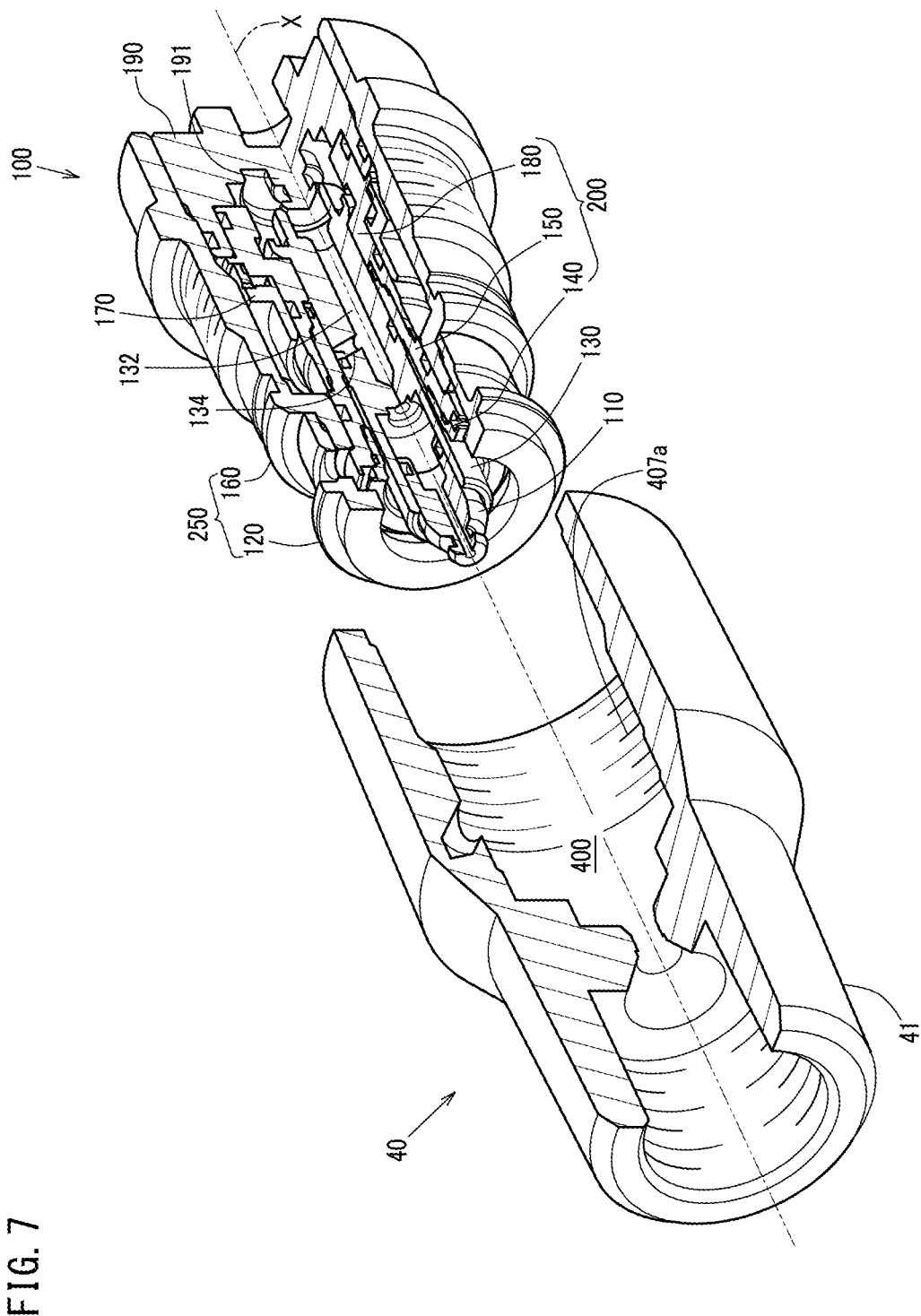
FIG. 7 is an enlarged isometric view showing how the combination valve cassette is attached.
Figure 11:
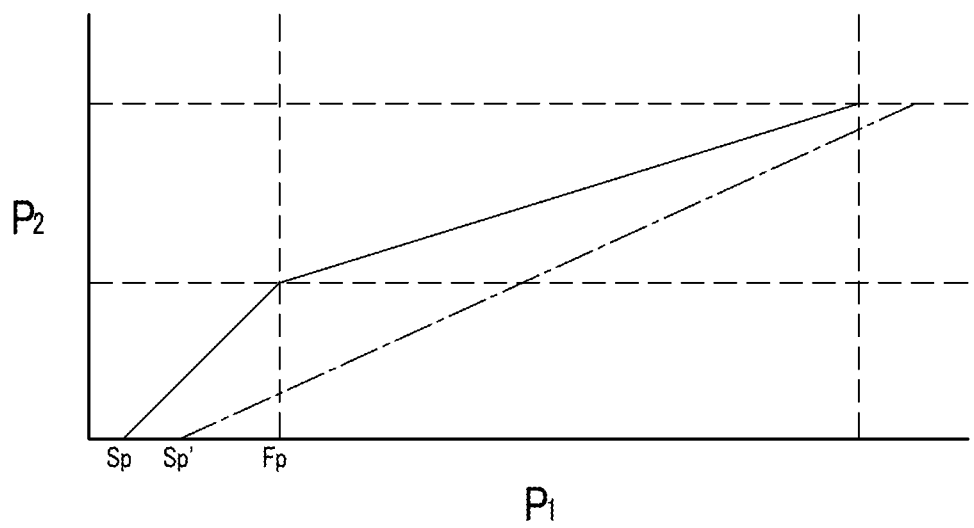
FIG. 11 is a graph showing characteristics of the combination valve cassette in each state.

FIG. 1 is a cross-sectional view of a combination valve cassette 100 in a container valve 1. FIG. 2 is a cross-sectional view of the container valve 1. FIG. 3 shows the combination valve cassette 100. FIG. 4 is an exploded cross-sectional view of the combination valve cassette 100. FIG. 5 is an exploded isometric view of the combination valve cassette 100. FIG. 6 is an enlarged cross-sectional view showing how the combination valve cassette 100 is attached to an outlet 40. FIG. 7 is an enlarged isometric view showing how the combination valve cassette 100 is attached to the outlet 40. FIG. 8 through FIG. 10 each show the combination valve cassette 100. FIG. 11 is a graph showing characteristics of the combination valve cassette 100 in each of states.

In more detail, FIG. 8A is a cross-sectional view of the combination valve cassette 100 in a normal gas consumption state (first predetermined pressure Fp≤primary side pressure P1), and FIG. 8B is a cross-sectional view of the combination valve cassette 100 in a gas consumption state where the primary side pressure P1 is low (second predetermined pressure Sp≤primary side pressure P1<first predetermined pressure Fp). FIG. 9A is a cross-sectional view of the combination valve cassette 100 in a residual pressure retaining state (primary side pressure P1<second predetermined pressure Sp), and FIG. 9B is a cross-sectional view of the combination valve cassette 100 in a state where a safety valve is actuated. FIG. 10A is a cross-sectional view of the combination valve cassette 100 in a full state, and FIG. 10B is a cross-sectional view of the combination valve cassette 100 in a state where a back pressure acts inadvertently.

FIG. 11 is a graph showing the relationship between the primary side pressure P1 and the secondary side pressure P2 in the combination valve cassette 100.

In FIG. 4, FIG. 5 and FIG. 7, O-rings 240, a first coil spring 210, a second coil spring 220 and a third coil spring 230 are not shown. In FIG. 4, the outlet 40 is not shown.

As shown in FIG. 1, the container valve 1 is a container valve which, when being attached to a cylinder container (not shown), restricts a flow of gas to supply the gas or fill the cylinder container with the gas. The container valve 1 includes a lengthy housing 31, a cylinder attachment portion 32 that is attached to a bottom part of the housing 31 and is attachable to the cylinder container as a result of being engaged with an attachment portion (not shown) provided in a top part of the cylinder container, an outlet 40 protruding laterally from a middle part of the housing 31, and a shut-off valve mechanism 50 attached to a top part of the housing 31.

Components in the shut-off valve mechanism 50 face each other with an O-ring being provided at an appropriate position therebetween, and the shut-off valve mechanism 50 and the housing 31 also face each other with an O-ring being provided at an appropriate position therebetween. The O-rings are not shown and will not be described in detail.

The housing 31 accommodates a shut-off valve attachment recessed portion 61 that is provided in a top part thereof and allows the shut-off valve mechanism 50 to be attached thereto, a primary side flow path 62 extending from a bottom end of the shut-off valve attachment recessed portion 61 to a bottom end of the cylinder attachment portion 32, and a secondary side flow path 63 extending from the bottom end of the shut-off valve attachment recessed portion 61 to a tip end of the outlet 40.

The shut-off valve attachment recessed portion 61 includes a working chamber 61a, which is a generally cylindrical recessed portion that is open upward, and a shut-off valve chamber 61b provided below working chamber 61a and having a slightly shorter diameter than that of the working chamber 61a. A bottom surface of the shut-off valve chamber 61b is in communication with a top end of the primary side flow path 62. A top end opening 62a of the primary side flow path 62 is formed in the bottom surface of the shut-off valve chamber 61b. An open valve seat 62b protruding upward is formed along an edge of the top end opening 62a.

The housing 31 also accommodates a flow path 60 including the shut-off valve chamber 61b, the primary side flow path 62 and the secondary side flow path 63. The flow path 60 extends from the bottom end of the cylinder attachment portion 32 to the tip end of the outlet 40.

The outlet 40 accommodates an in-outlet secondary side flow path 400, which is formed in the outlet 40 and is a part of the secondary side flow path 63. The in-outlet secondary side flow path 400 and the outlet 40 will be described later together with a combination valve cassette 100.

As shown in FIG. 2, the shut-off valve mechanism 50 attached to the shut-off valve attachment recessed portion 61 includes a rotation handle 51, a ground nut 52, a spindle 53, an intermediate transmission member 54, and a shut-off member 55 attached to a bottom surface of the intermediate transmission member 54.

The rotation handle 51 has, as seen in a plan view, a generally circular cloud shape having a wavy outer edge protruding at eight positions, and includes an engageable portion 51a allowing a to-be-engaged portion 53a in a top part of the spindle 53 to be engaged therewith.

The ground nut 52 includes a head nut portion 52a and a male screw portion 52b engageable with a female screw formed in an inner surface of the working chamber 61a of the shut-off valve attachment recessed portion 61. The ground nut 52 is hollow and generally cylindrical.

As shown in FIG. 2, the spindle 53 includes the to-be-engaged portion 53a engageable with the engageable portion 51a of the rotation handle 51, and an engageable recessed portion 53b engageable with a spindle engageable recessed portion 54a of the intermediate transmission member 54.

As shown in FIG. 2, the intermediate transmission member 54 is generally cylindrical, and includes the spindle engageable recessed portion 54a allowing the engageable recessed portion 53b of the spindle 53 to be engaged therewith, and a shut-off member engageable recessed portion 54b allowing the shut-off member 55 to be engaged therewith. The spindle engageable recessed portion 54a is provided at a top end of the intermediate transmission member 54, and the shut-off member engageable recessed portion 54b is provided in a bottom part of the intermediate transmission member 54.

As shown in FIG. 2, the shut-off member 55 is an elastic member that is circular as seen in a plan view, and is engageable with the shut-off member engageable recessed portion 54b of the intermediate transmission member 54. The shut-off member 55 allows the open valve seat 62b to eat thereinto in a valve close state.

The shut-off valve mechanism 50, including the rotation handle 51, the ground nut 52, the spindle 53, the intermediate transmission member 54 and the shut-off member 55, is assembled as follows. The shut-off member engageable recessed portion 54b of the intermediate transmission member 54 is put into engagement with the shut-off member 55, and the engageable recessed portion 53b of the spindle 53 is put into engagement with the spindle engageable recessed portion 54a of the intermediate transmission member 54. The ground nut 52 is attached to the spindle 53, and the male screw portion 52b of the ground nut 52 is put into engagement with the female screw of the shut-off valve attachment recessed portion 61 to attach the ground nut 52 to the shut-off valve attachment recessed portion 61. The to-be-engaged portion 53a of the spindle 53 is put into engagement with the engageable portion 51a of the rotation handle 51. Thus, the shut-off valve mechanism 50 is assembled.

The rotation handle 51 of the shut-off valve mechanism 50 thus structured is screwed in a tightening direction to press the intermediate transmission member 54 downward via the spindle 53. In this process, the open valve seat 62b formed along the top end opening 62a eats into the shut-off member 55 engaged with the shut-off member engageable recessed portion 54b of the intermediate transmission member 54, and thus the shut-off member 55 seals the top end opening 62a. This state is referred to as a "sealed state".

By contrast, when the rotation handle 51 is rotated in a releasing direction to pull the spindle 53, the intermediate transmission member 54 is moved upward via the spindle 53. Therefore, the top end opening 62a is open to allow the primary side flow path 62, the shut-off valve chamber 61b and the second-side flow path 63 to be in communication with each other. Thus, the flow path 60 allows a fluid to flow therein. This state is referred to as an "open state".

Now, the outlet 40, and the in-outlet secondary side flow path 400 formed in the outlet 40 and forming a part of the secondary side flow path 63 of the flow path 60, will be described with reference to FIG. 2.

The outlet 40 has a generally cylindrical shape extending in a lateral direction, and includes a connection permission portion 41 allowing connection of a filling jig (not shown) and a tool (not shown) using gas. The in-outlet secondary side flow path 400 extending throughout the outlet 40 in an axial direction is formed in the outlet 40.

In the following description, a part of the secondary side flow path 63 that is located in the housing 31 is referred to as an in-housing secondary side flow path 64, and a part of the secondary side flow path 63 that is located in the outlet 40 is referred to as the in-outlet secondary side flow path 400. The in-housing secondary side flow path 64 and the in-outlet secondary side flow path 400 form the secondary side flow path 63, which is T shaped as seen in a plan view.

As shown in FIG. 6, the in-outlet secondary side flow path 400 has a space extending in an axial direction therethough. The space includes a first space 401, a second space 402, a third space 403, a fourth space 404, a long-diameter fifth space 405, a long-diameter sixth space 406, and a long-diameter seventh space 407 sequentially from the side of the connection permission portion 41 (in FIG. 6, from left to right).

The first space 401 permits the above-described filling jig (see FIG. 10A) or the like to be inserted thereinto.

The second space 402 has a diameter shorter than that of the first space 401. The third space 403 has a diameter longer than that of the second space 402 and shorter than that of the first space 401. The fourth space 404 is a diameter longer than that of the first space 401. The fifth space 405 has a diameter longer than that of the fourth space 404. The sixth space 406 has a diameter longer than that of the fifth space 405. The seventh space 407 has a diameter longer than that of the sixth space 406, and is open rearward.

The fourth space 404 and the fifth space 405 are in communication with the in-housing secondary side flow path 64 via a circular flow path 409 described below. The seventh space 407 has a screw groove 407a formed in an inner surface thereof. The screw groove 407a is engageable with a thread 167 formed in an outer circumferential surface of a front body portion 161 of a valve cylinder 160, which is to be inserted into the seventh space 407. An excessive pressure flow-out path 408 runs through the seventh space 407 in a diametrical direction thereof and is in communication with the outside of the seventh space 407. The excessive pressure flow-out path 408 allows an excessive pressure to flow out.

The combination valve cassette 100 will be described with reference to FIG. 3 through FIG. 11. The combination valve cassette 100 is attachable to the third space 403 through the seventh space 407 of the in-outlet secondary side flow path 400. In the open state of the shut-off valve mechanism 50, the combination valve cassette 100 acts as a residual pressure retaining mechanism, a pressure decreasing mechanism, and a safety valve mechanism.

The combination valve cassette 100 includes a check valve 110, a circular flow path formation ring 120, a check valve retaining cylinder 130, a seal seat 140, a pressure decreasing piston 150, a valve cylinder 160, a relief valve cylinder 170, a valve box 180, a valve lid 190, the O-rings 240, the first coil spring 210, the second coil spring 220, and the third coil spring 230.

In FIG. 3, the left side is the front side (tip end side) in an axial direction, and the right side is the rear side (rear end side) in the axial direction. In FIG. 4 and FIG. 5, the O-rings 240, the first spring 210, the second coil spring 220 and the third coil spring 230 are not shown. In this specification, the O-rings 240 are represented by the same reference sign, but each of the O-rings 240 has an appropriate size, is formed of an appropriate material, and has an appropriate shape or a cross-sectional shape in accordance with the position at which the O-ring is provided.

The check valve 110 includes a diameter decreasing portion 111 having a diameter decreasing toward the front side, and a cylindrical portion 112. The diameter decreasing portion 111 and the cylindrical portion 112 each have an O-ring groove 113 formed in an outer circumferential surface thereof. The O-ring groove 113 allows the O-ring 240 to fit thereinto. The cylindrical portion 112 has an inner space 114 formed therein. The inner space 114 is open rearward and allows a front part of the second coil spring 220 to fit thereinto. The check valve 110 has an axial direction through-hole 115 running from a tip end of the diameter decreasing portion 111 to the inner space 114 in the axial direction.

The circular flow path formation ring 120 is located on inner circumferential surfaces of the third space 403 through the fifth space 405 of the in-outlet secondary side flow path 400. The circular flow path formation ring 120 includes a front body portion 121 located in the third space 403, and a rear body portion 122 located to the rear thereof. The circular flow path formation ring 120 is cylindrical and has an inner space 125 running therethrough in the axial direction X. The front body portion 121 has a flange 123 formed to contact an inner surface of the third space 403. The rear body portion 122 has a through-hole 124 running therethrough a diametrical direction thereof. An outer circumferential surface of the front body portion 121 and a front surface of the flange 123, of the circular flow path formation ring 120 having such a structure, form a corner portion, and an O-ring 240 is fit into the corner portion. The rear body portion 122 has a screw groove 122a formed in an inner surface thereof.

The check valve retaining cylinder 130 includes an accommodation space 131 that is open forward and accommodates the above-described check valve 110 and the second coil spring 220, an inner flow space 132 that is located to the rear of the accommodation space 131 and extends in the axial direction, a seal recessed portion 133 that is located to the rear of the inner flow space 132, is open rearward and allows a seal cylinder 191 of the valve lid 190 described below to fit thereinto, and communication flow paths 134 that are located to the front of the inner flow space 132 and communicate the outside of the check valve retaining cylinder 130 and the inner flow space 132 to each other in an inclining manner. The check valve retaining cylinder 130 includes a support flange 135 in a rear part thereof. The support flange 135 protrudes in a diametrical direction thereof and supports a front end of the third coil spring 230 described below. The plurality of communication flow paths 134 are provided in a circumferential direction and runs through the check valve retaining cylinder 130 while inclining rearward from the diametrical outer side toward the diametrical inner side.

The seal seat 140 is generally cylindrical, and includes a flange 141 in a front part thereof, which protrudes diametrically outward, and an outsert space 142 outsertable onto a front part of the check valve retaining cylinder 130. The seal seat 140 has a thread 140a formed in an outer circumferential surface of a rear part thereof.

The pressure decreasing piston 150 includes a front body portion 151 allowing a rear part of the seal seat 140 to be engaged therewith, a rear body portion 153 engageable with a front body portion 181 of the valve box 180 described below, and a middle body portion 152 provided between the front body portion 151 and the rear body portion 153. The pressure decreasing piston 150 is generally cylindrical and has a run-through space 155 running therethrough in the axial direction. The pressure decreasing piston 150 has an O-ring groove 154 formed in each of an outer circumferential surface of the middle body portion 152 and an outer circumferential surface of a rear part of the rear body portion 153. The O-ring groove 154 allows the O-ring 240 to fit thereinto.

The front body portion 151 has a screw groove 151a formed in an inner surface thereof. The screw groove 151a is engageable with the thread 140a of the seal seat 140. The rear body portion 153 has a thread 153a formed in an outer circumferential surface of a front part thereof.

The valve cylinder 160 includes a front body portion 161 insertable into the in-outlet secondary side flow path 400 and a rear body portion 162 protruding rearward from the outlet 40 in an assembled state. The valve cylinder 160 is generally cylindrical and has a run-through space 163 running therethrough in the axial direction X. The rear body portion 162 has a contact flange 164 at a front end thereof. The contact flange 164 protrudes diametrically outward and contacts a rear end surface of the outlet 40 in an assembled state.

The valve cylinder 160 includes a front diameter decreasing portion 165 to the front of the front body portion 161. The front diameter decreasing portion 165 is outsertable onto the middle body portion 152 of the pressure decreasing piston 150, and is engageable from the rear with the rear body portion 122 of the circular flow path formation ring 120. The front diameter decreasing portion 165 has a thread 165a formed in an outer circumferential thereof. The thread 165a is engageable with the screw groove 122a of the circular flow path formation ring 120. The rear body portion 162 has a screw groove 162a formed in an inner surface thereof. The screw groove 162a is engageable with a thread 196 of the valve lid 190. The valve cylinder 160 has an O-ring groove 166 formed in an outer circumferential surface of a front part of the front body portion 161. The O-ring groove 166 allows the O-ring 240 to fit thereinto.

The front body portion 161 is engageable with the seventh space 407 of the in-outlet secondary side flow path 400 of the outlet 40. The front body portion 161 has the thread 167 formed in an outer circumferential surface thereof. The thread 167 is engageable with the screw groove 407a formed in the inner surface of the seventh space 407.

The relief valve cylinder 170 is generally cylindrical and includes an outsert run-through space 171 running therethrough in the axial direction X and is outsertable onto the front body portion 181 of the valve box 180 described below. The relief valve cylinder 170 also includes a front body portion 172 outsertable onto the first coil spring 210, and a long-diameter rear body portion 173 protruding diametrically outward so as to support a rear part of the first coil spring 210. The long-diameter rear body portion 173 has an O-ring groove 174 formed in a back surface thereof. The O-ring groove 174 allows the O-ring 240 to fit thereinto.

The valve box 180 includes a front body portion 181 that allows the rear body portion 153 of the pressure decreasing piston 150 to be inserted thereinto from the front, and is insertable into the outsert run-through space 171 of the relief cylinder 170. The valve box 180 also includes an insertion rear body portion 182 insertable into a front recessed portion 192 of the valve lid 190 described below. The front body portion 181 and the insertion rear body portion 182 are both cylindrical and form a stepped shape. The valve box 180 has a run-through space 183 running therethrough in the axial direction X.

The front body portion 181 allowing the rear body portion 151 of the pressure decreasing piston 150 to be inserted thereinto has a screw groove 181a formed in an inner surface thereof. The screw groove 181a is engageable with a thread 153a of the rear body portion 153 inserted thereinto.

The insertion rear body portion 182 has an O-ring groove 184 formed in an outer circumferential surface of a rear part thereof. The O-ring groove 184 allows the O-ring 240 to fit thereinto. The insertion rear body portion 182 has an excessive pressure flow path 185 running therethrough forward and outward from the run-through space 183 thereof.

The valve lid 190 is generally disc-shaped and is insertable into the rear body portion 162 of the valve cylinder 160. The valve lid 190 has the front recessed portion 192 in a front part thereof. The front recessed portion 192 allows the insertion rear body portion 182 of the valve body 180 to be inserted thereinto. The valve lid 190 has the seal cylinder 191, which is cylindrical, to the rear of the front recessed portion 192. The seal cylinder 191 protrudes forward and is insertable into the seal recessed portion 133 of the check valve retaining cylinder 130.

The valve lid 190 has an O-ring groove 194 formed in each of an outer circumferential surface of the seal cylinder 191 and in an outer circumferential surface of a front part of the valve lid 190. The O-ring groove 194 allows the O-ring 240 to fit thereinto.

The seal cylinder 191 has a ring groove 193 formed in a diametrically outer portion. The ring groove 193 is recessed rearward and allows a rear part of the third coil spring 230 to be inserted thereinto. The valve lid 190 has a jig hole 195 formed in a rear surface thereof. The jig hole 195 allows a rotation attachment jig (not shown) to be inserted thereinto. The valve lid 190 has a thread 196 formed in an outer surface thereof. The thread 196 is engageable with the screw groove 162a formed in the inner surface of the rear body portion 162.

The combination valve cassette 100 having such a structure is assembled as follows.

First, the seal seat 140 is inserted from the front into the pressure decreasing piston 150, and the thread 140a of the seal seat 140 is put into engagement with the screw groove 151a formed in the inner surface of the front body portion 151 of the pressure decreasing piston 150. In this step, the O-ring 240 is fit between the flange 141 and the front body portion 151 of the pressure decreasing piston 150 so as to restrict the O-ring 240 by the flange 141 of the seal seat 140 such that the O-ring 240 is not moved forward.

In the state where the O-ring 240 is fit into the O-ring groove 154, the rear body portion 153 is inserted from the front into the front body portion 181 of the valve box 180, and the thread 153a of the rear body portion 153 is put into engagement with the screw groove 181a of the front body portion 181. Thus, the seal seat 140, the pressure decreasing piston 150 and the valve box 180 are integrated together. The seal seat 140, the pressure decreasing piston 150 and the valve box 180 thus integrated will be referred to as a "pressure decreasing valve assembly 200".

The check valve retaining cylinder 130 is inserted from the rear into the integrated pressure decreasing valve assembly 200, and the pressure decreasing valve assembly 200 is outserted onto the check valve retaining cylinder 130 such that the pressure decreasing valve assembly 200 is movable with respect to the check valve retaining cylinder 130 in the axial direction X.

The relief valve cylinder 170 having the O-ring 240 fit into the O-ring groove 174 is inserted from the front into the integrated pressure decreasing valve assembly 200, and the relief valve cylinder 170 is outserted onto the pressure decreasing valve assembly 200.

The second coil spring 220, and the check valve 110 having the O-ring 240 fit into the O-ring groove 113, are inserted from the front into the accommodation space 131 of the check valve retaining cylinder 130, and the check valve 110 is accommodated so as to be urged forward by the second coil spring 220 by use of the check valve retaining cylinder 130 as a counterforce.

Separate from the above-described assembling process, the circular flow path formation ring 120 is inserted from the rear into the third space 403 of the in-outlet secondary side flow path 400 so as to fit the front body portion 121 into the third space 403. In this step, the O-ring 240 is attached to the space enclosed by the outer circumferential surface of the front body portion 121, the front surface of the flange 123, and an inner surface of the third space 203.

The front diameter decreasing portion 165 is inserted into the rear body portion 122. The valve cylinder 160 having the O-ring 240 fit into the O-ring groove 166 is inserted from the rear into the in-outlet secondary side flow path 400 such that the thread 165a is put into engagement with the screw groove 122a. The thread 167 of the valve cylinder 160 is put into engagement with the screw groove 407a formed in the inner surface of the seventh space 407 of the in-outlet secondary side flow path 400. Thus, the outlet 40, the circular flow path formation ring 120 and the valve cylinder 160 are integrated together.

The space enclosed by an outer circumferential surface of the rear body portion 122 of the circular flow path formation ring 120 having the front body portion 121 inserted into the third space 403, a front surface of the front body portion 161 of the valve cylinder 160, and inner surfaces of the fourth space 404 and the fifth space 405, forms the circular flow path 409 communicating the inside of the in-outlet secondary side flow path 400 and the in-housing secondary side flow path 64 to each other.

The check valve 110, the check valve retaining cylinder 130, the pressure decreasing valve assembly 200 and the relief valve cylinder 170 that are assembled together is inserted from the rear into the circular flow path formation ring 120 and the valve cylinder 160 integrated with the outlet 40.

In this step, the first coil spring 210 is attached to the front body portion 161 of the valve cylinder 160 to support a front end of the first coil spring 210 by a rear surface of the front body portion 161. The check valve 110, the check valve retaining cylinder 130, the pressure decreasing valve assembly 200 and the relief valve cylinder 170 that are assembled together is inserted from the rear into the first coil spring 210. A rear end of the first coil spring 210 is supported by a front surface of the long diameter rear body portion 173 of the relief valve cylinder 170. Namely, the relief valve cylinder 170 is put into a state of being urged rearward by the first coil spring 210 by use of, as a counterforce, the valve cylinder 160 integrated with the outlet 40.

The valve lid 190 is inserted from the rear into the rear body portion 162 of the valve cylinder 160. In this state, the third coil spring 230 is attached such that the front end thereof is supported by the support flange 135 of the check valve retaining cylinder 130 and such that a rear end of the third coil spring 230 is supported by the ring groove 193 of the valve lid 190. The thread 196 is put into engagement with the screw groove 162a of the valve cylinder 160. Thus, the check valve retaining cylinder 130 is put into a state of being urged forward by the third coil spring 230 by use of the valve lid 190 as a counterforce.

In this manner, the pressure decreasing valve assembly 200 is urged rearward by the first coil spring 210. Therefore, an inner surface of the circular flow path formation ring 120 and a front part of the pressure decreasing valve assembly 200 are separated from each other in the axial direction X in the third space 403. Thus, as shown in FIG. 3, the combination valve cassette 100, which is assembled with the outlet 40 is open and is of a low pressure open type (initial state).

As shown in FIG. 6 and FIG. 7, in the combination valve cassette 100, which is assembled with the in-outlet secondary side flow path 400 of the outlet 40, the circular flow path formation ring 120 and the valve cylinder 160 form a cassette frame 250, which is an outer shell. The other components included in the combination valve cassette 100 are located inside the outer shell coaxially. Therefore, the combination valve cassette 100 including the outer shell formed of the circular flow path formation ring 120 and the valve cylinder 160 is compact. The combination valve cassette 100 merely needs to be inserted into the in-outlet secondary side flow path 400 of the outlet 40, so that the container valve 1 acts as a combination valve.

Namely, the combination valve cassette 100 includes the cassette frame 250 including the circular flow path formation ring 120 and the valve cylinder 160, and has a cassette structure having a pressure decreasing valve mechanism, the residual pressure retaining valve mechanism, the safety valve mechanism and a block mechanism assembled inside the cassette frame 250. The combination valve cassette 100 merely needs to be inserted into the in-outlet secondary side flow path 400 of the outlet 40 in order to improve the ease of assembly of the container valve 1. The combination valve cassette 100, which has a cassette structure, may allow a performance inspection to be done easily before being attached to the outlet 40. As can be seen from the above, the combination valve cassette 100 having the circular flow path formation ring 120 and the valve cylinder 160 as the outer shell has a cassette structure to improve the ease of assembly and allow the performance inspection to be done easily.

The method of assembly, and the order of assembly, of the combination valve cassette 100 described above are merely an example, and the combination valve cassette 100 may be assembled by an appropriate order or method without being limited to any of the above.

An operation state of the combination valve cassette 100 having the above-described structure will be described below.

First, from the initial state (valve open position) shown in FIG. 3, the rotation handle 51 is rotated in a loosening direction to screw the spindle 53 out to provide the open state. Gas filling the cylinder container (not shown) passes the primary side flow path 62, the shut-off valve chamber 61b and the secondary side flow path 63 and flows into the circular flow path 409 via the in-housing secondary side flow path 64. The gas flowing into the circular flow path 409 passes the through-hole 124 of the circular flow path 409 and flows into the combination valve cassette 100.

The gas flowing into the combination valve cassette 100 passes between the front part of the pressure decreasing valve assembly 200 at the valve open position and an inner surface of the circular flow path formation ring 120, passes between the inner surface of the pressure decreasing valve assembly 200 and an outer surface of the check valve retaining cylinder 130, and flows into the inner flow space 132 through the communication flow path 134.

In this state, an area between the inner surface of the circular flow path formation ring 120 and the front part of the pressure decreasing valve assembly 200, and an area between the inner surface of the pressure decreasing valve assembly 200 and the outer surface of the check valve retaining cylinder 130, the communication flow path 134 and the inner flow space 132 will be referred to as a "gas induction passage H" (see FIG. 8A).

The gas passes the gas induction passage H and flows into a position to the rear of the pressure decreasing valve assembly 200 and the check valve retaining cylinder 130. The pressure of the gas moves forward the pressure decreasing valve assembly 200 against the rearward spring force of the first coil spring 210, and the inner surface of the circular flow path formation ring 120 contacts the front part of the pressure decreasing valve assembly 200 to provide the sealed state (valve close position). Namely, the combination valve cassette 100, which is of an open type in a still state, attempts to be in the sealed state by the flow of the gas.

When the combination valve cassette 100 attempts to be in the sealed state, the gas induction passage H, which guides the gas rearward and in which the pressure acts on the pressure decreasing valve assembly 200 from rear to the front, attempts to be blocked by the contact of the inner surface of the circular flow path formation ring 120 and the front part of the pressure decreasing valve assembly 200 at the valve close position. Therefore, the pressure decreasing valve assembly 200 is moved rearward by the spring force of the first spring 210 to be at the valve open position, and thus the gas induction passage H is secured. In this manner, the inner surface of the circular flow path formation ring 120 and the front part of the pressure decreasing valve assembly 200 contact each other (valve close position: enlarged view of part "a" in FIG. 8) and are separated from each other (valve open position: enlarged view of part "b" in FIG. 8) repeatedly at a high speed by the pressure of the gas. The gas flows from the circular flow path 409 into the third space 403. Therefore, the pressure of the gas is decreased to a predetermined pressure (secondary side pressure P2: see FIG. 11) by the area size difference between the circular flow path 409 and third space 403. Thus, the pressure decreasing valve assembly 200 acts as a pressure decreasing valve mechanism.

The check valve 110 (valve close position), the diameter decreasing portion 111 of which has been in contact with an inner wall of the second space 402, is moved rearward to the valve open position by the pressure of the gas flowing into the third space 403 while having the pressure thereof decreased, against the spring force of the second coil spring 220. Thus, the second space 402 is opened to release the gas from the first space 401, and the gas is consumed.

In this state, the rotation handle 51 is rotated in a tightening direction to screw the spindle 53 in to provide the sealed state. Then, the flow of the gas into the in-outlet secondary side flow path 400 via the in-housing secondary side flow path 64 and the circular flow path 409 is stopped. Therefore, the combination valve cassette 100 is returned to the initial state shown in FIG. 3 in the order opposite to the order described above. Namely, the pressure decreasing valve assembly 200 is returned to the valve open position, and the check valve 110 is returned to the valve close position.

In the case where the high pressure gas is continuously released as shown in the high pressure region in the graph of FIG. 11 in the above-described state, primary side pressure P1, which is the pressure of the gas in the cylinder container, is decreased.

When the primary side pressure P1 is thus decreased, the pressure of the gas that passes the gas induction passage H and is against the spring force of the first coil spring 210 is decreased. When the primary side pressure P1 is decreased to a region below first predetermined pressure Fp shown in FIG. 11, the pressure decreasing valve assembly 200 is not moved forward against the spring force of the first coil spring 210. As a result, the open state as described above is provided in which the inner surface of the circular flow path formation ring 120 and the front part of the pressure decreasing valve assembly 200 are separated from each other (see FIG. 8B).

Even in the open state where the primary side pressure P1 is decreased to below the first predetermined pressure Fp and the inner surface of the circular flow path formation ring 120 and the front part of the pressure decreasing valve assembly 200 are separated from each other (the pressure decreasing valve assembly 200 is at the valve open position), if the pressure of the gas flowing into the third space 403 is higher than second predetermined pressure Sp, the check valve 110, the diameter decreasing portion 111 of which has been in contact with the inner wall of the second space 402, namely, which is at the valve close position, is moved rearward (valve open position) by the pressure against the spring force of the second coil spring 220. As a result, the second space 402 is opened to release the gas from the first space 401.

When the primary side pressure P1 is further decreased to below the second predetermined pressure Sp, the pressure is not sufficient to move rearward the check valve 110 against the spring force of the second coil spring 220. Thus, the sealed state in which the diameter decreasing portion 111 is in contact with the inner wall of the second space 402 (valve close position) is provided, and the release of the gas is stopped (see FIG. 9A). Therefore, the gas of the second predetermined pressure Sp remains in the cylinder container. Namely, the combination valve cassette 100 acts as the residual pressure retaining mechanism.

In this manner, as shown in FIG. 11, the combination valve cassette 100 acts as the pressure decreasing mechanism when the pressure is the first predetermined pressure Fp or higher. When the pressure is lower than the first predetermined pressure Fp and the second predetermined pressure Sp or higher, the pressure decreasing mechanism is opened, and the gas flowing into the third space 403 bypasses the pressure decreasing mechanism and is released from the first space 401 via the second space. Thus, the gas is consumed. Therefore, although the flow rate of the gas released along with the decrease in the primary side pressure P1 is decreased, the pressure P and the flow rate are in an equal ratio state. Unlike in a combination valve cassette of a constantly sealed type that is stopped at second predetermined pressure Sp' (represented by the one-dot chain line in FIG. 11), in the combination valve cassette 100, the flow rate of the gas is secured until the pressure is decreased to the second predetermined pressure Sp to provide the sealed state.

The combination valve cassette 100 having the above-described structure operates as follows when the gas acted on by an excessive pressure flows into the combination valve cassette 100 or when the pressure of the gas in the combination valve cassette 100 becomes excessive. As shown in FIG. 9B, the gas flowing to a position to the rear of the check valve retaining cylinder 130 via the gas induction passage H passes the run-through space 183 and the excessive pressure flow path 185 of the valve box 180, and acts on the relief valve 170 from the rear side thereof at the valve close position. Therefore, the relief valve 170 is moved forward to the valve open position against the spring force of the first coil spring 210, and the gas acted on by the excessive pressure flows out to the outside via the excessive pressure flow-out path 408.

The cylinder container may be filled with the gas via the combination valve cassette 100 as follows. As shown in FIG. 10A, the check valve 110 and the check valve retaining cylinder 130 are moved rearward by a filling jig J represented by the one-dot chain line to open the second space 402. Thus, the gas passes the third space 403, the circular flow path 409 and the in-housing secondary side flow path 64 and also the flow path 60 to fill the cylinder container.

This will be described in more detail. The filling jig J moves rearward the check valve 110 with respect to the check valve retaining cylinder 130 against the spring force of the second coil spring 220 and also moves rearward the check valve retaining cylinder 130 against the spring force of the third coil spring 230.

As a result, the first space 401, the second space 402, the third space 403, the area between the inner surface of the circular flow path formation ring 120 and the front part of the pressure decreasing valve assembly 200, the circular flow path 409 and the in-housing secondary side flow path 64 are in communication with each other. Therefore, when the rotation handle 51 is rotated in a loosening direction to open the container valve 1, the first space 401 of the in-outlet secondary side flow path 400 and the container valve 1 are in direct communication with each other by the filling jig J. The gas supplied from a filling device (not shown) connected with the connection permission portion 41 is provided to fill the cylinder container via the flow path 60.

The first space 401 of the in-outlet secondary side flow path 400 and the container valve 1 are in direct communication with each other by the filling jig J. Therefore, the pressure inside the container valve 1 in a filled state may be measured or components of the gas filling the cylinder container may be analyzed directly from the first space with no use of any special jig. Since the first space 401 of the in-outlet secondary side flow path 400 and the container valve 1 are in direct communication with each other by the filling jig J, the gas in the cylinder valve 1 may be absorbed to provide a vacuum state or entirely released, from the first space 401.

In this state, the seal cylinder 191 of the valve lid 190 is inserted into the seal recessed portion 133 of the check valve retaining cylinder 130. Therefore, the inner flow space 132 is sealed at the rear end and the gas induction passage H is blocked. Thus, the pressure decreasing valve assembly 200 or the relief valve cylinder 170 does not move forward, and the cylinder container is filled with the gas with certainty.

Even in the case where an inadvertent excessive pressure in an opposite direction (hereinafter, referred to as a "back pressure") acts on the combination valve cassette 100 from the first space 401, as shown in FIG. 10B, the back pressure moves rearward the check valve retaining cylinder 130 against the spring force of the third coil spring 230, and the seal cylinder 191 of the valve lid 190 is inserted into the seal recessed portion 133 of the check valve retaining cylinder 130. Therefore, the inner flow space 132 is sealed at the rear end and the gas induction passage H is blocked. In addition, the gas acted on by the back pressure passes the axial direction through-hole 115 of the check valve 110 and flows into the accommodation space 131 of the check valve retaining cylinder 130. The back pressure acts on the check valve 110 and presses the check valve 110 forward. Thus, the check valve 110 acts as a one-way valve and prevents the gas from flowing into the combination valve cassette 100 and also prevents the gas acted on by the back pressure from acting on the relief valve cylinder 170.

In the above example, the relief valve cylinder 170 is outserted onto the pressure decreasing valve assembly 200 and is urged rearward by the first coil spring 210. The gas passes from the run-through space 183 to the excessive pressure flow path 185 of the valve box 180, acts from the rear side of the relief valve cylinder 170, moves forward the relief valve cylinder 170 against the spring force of the first coil spring 210, and passes the excessive pressure flow-out path 408. Thus, the gas acted on by the excessive pressure flows out. The combination valve cassette 100 may include another safety valve mechanism 300 instead of the relief valve cylinder 170.

Hereinafter, a combination valve cassette 100A including the safety valve mechanism 300 will be described with reference to FIG. 12 through FIG. 19.

Figure 12:
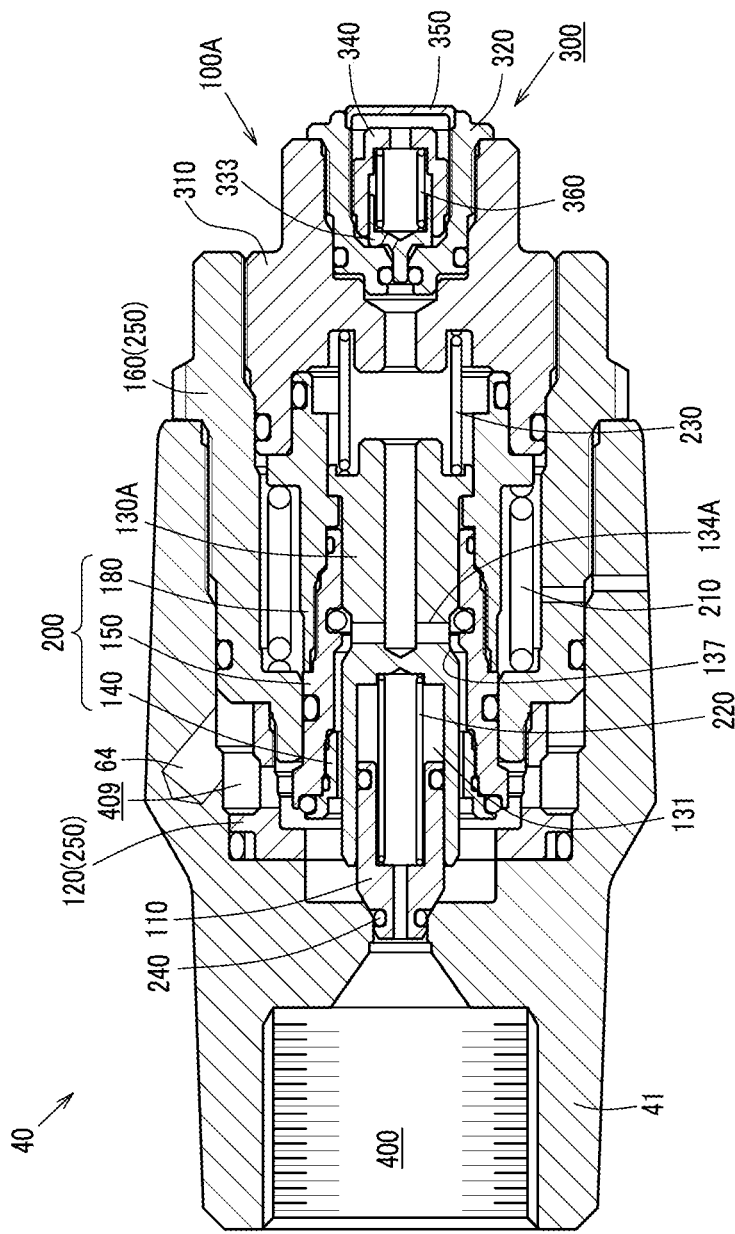
FIG. 12 is an enlarged cross-sectional view of another combination valve cassette.
Figure 13:
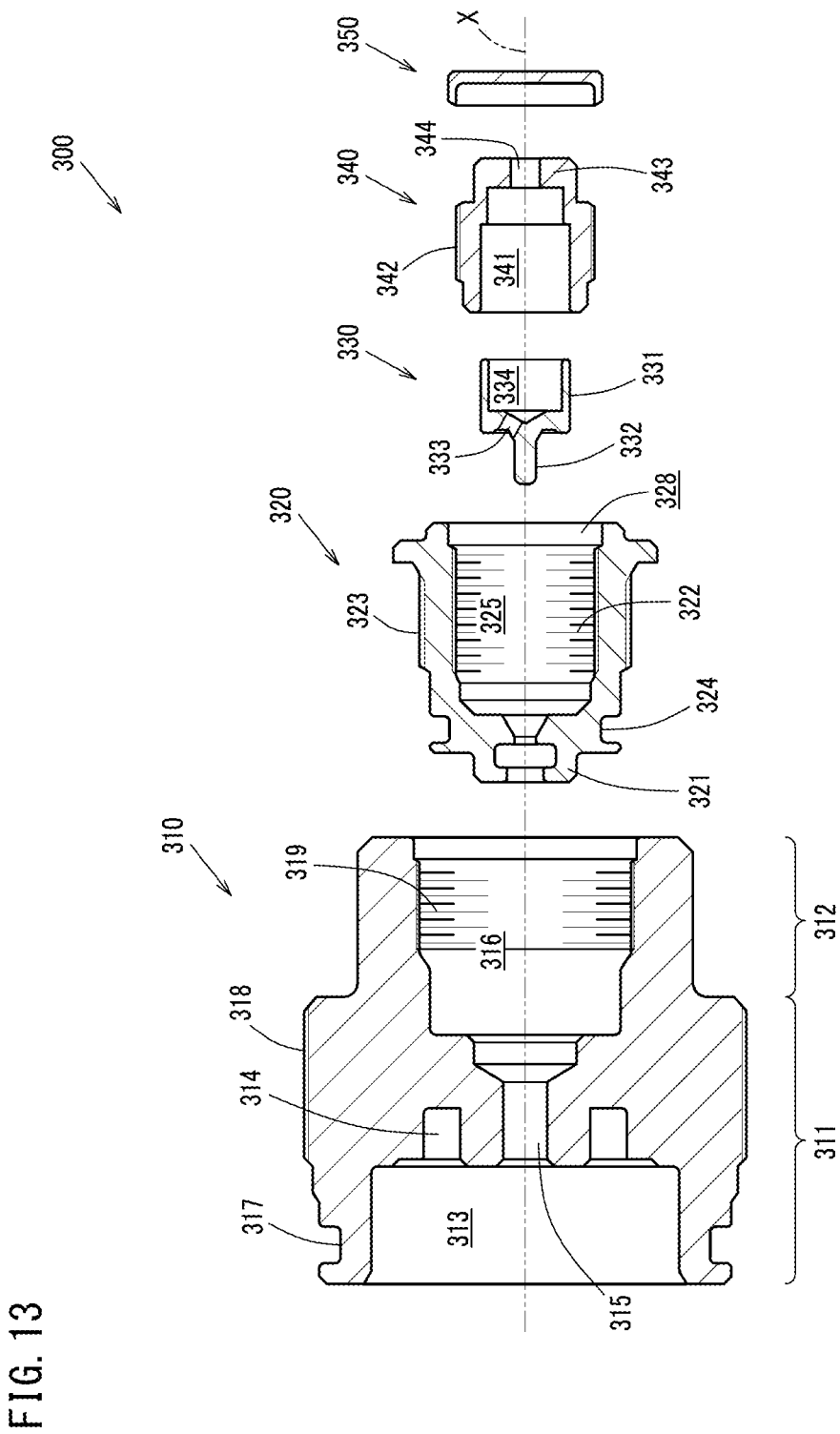
FIG. 13 is an exploded cross-sectional view of a safety valve mechanism in the another combination valve cassette.
Figure 14:
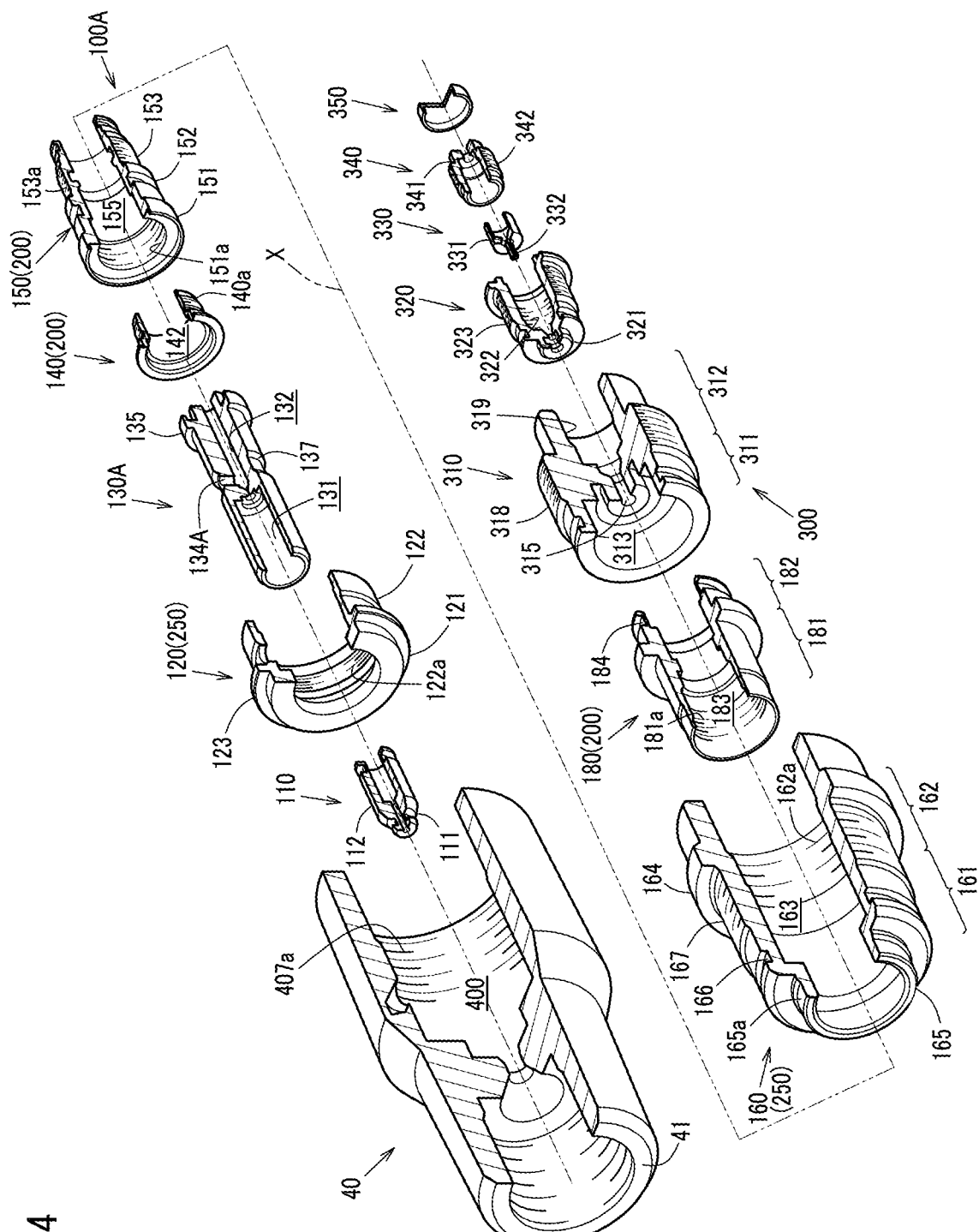
FIG. 14 is an exploded isometric view of the another combination valve cassette.
Figure 15:
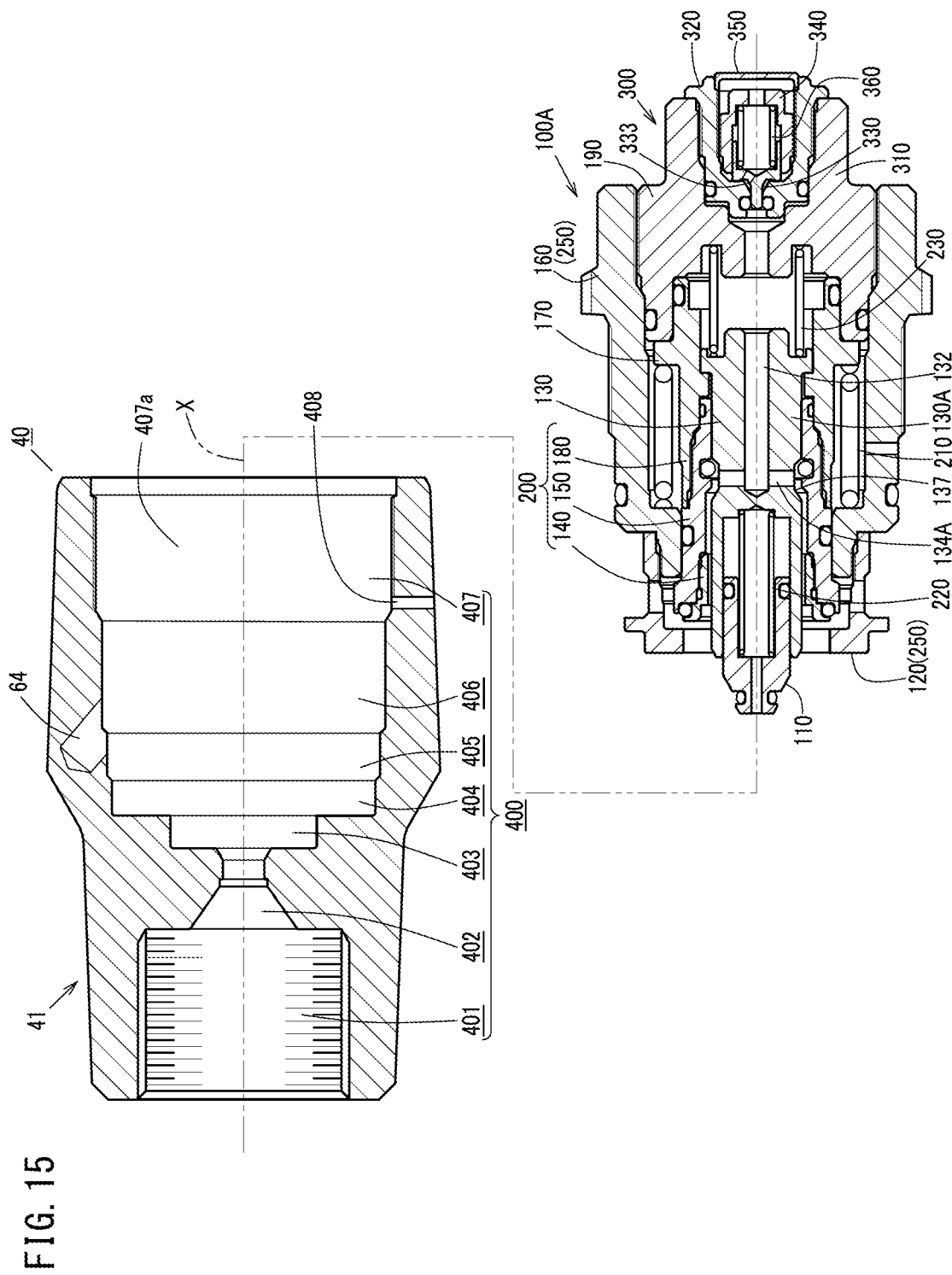
FIG. 15 is an enlarged cross-sectional view showing how the another combination valve cassette is attached.
Figure 16:
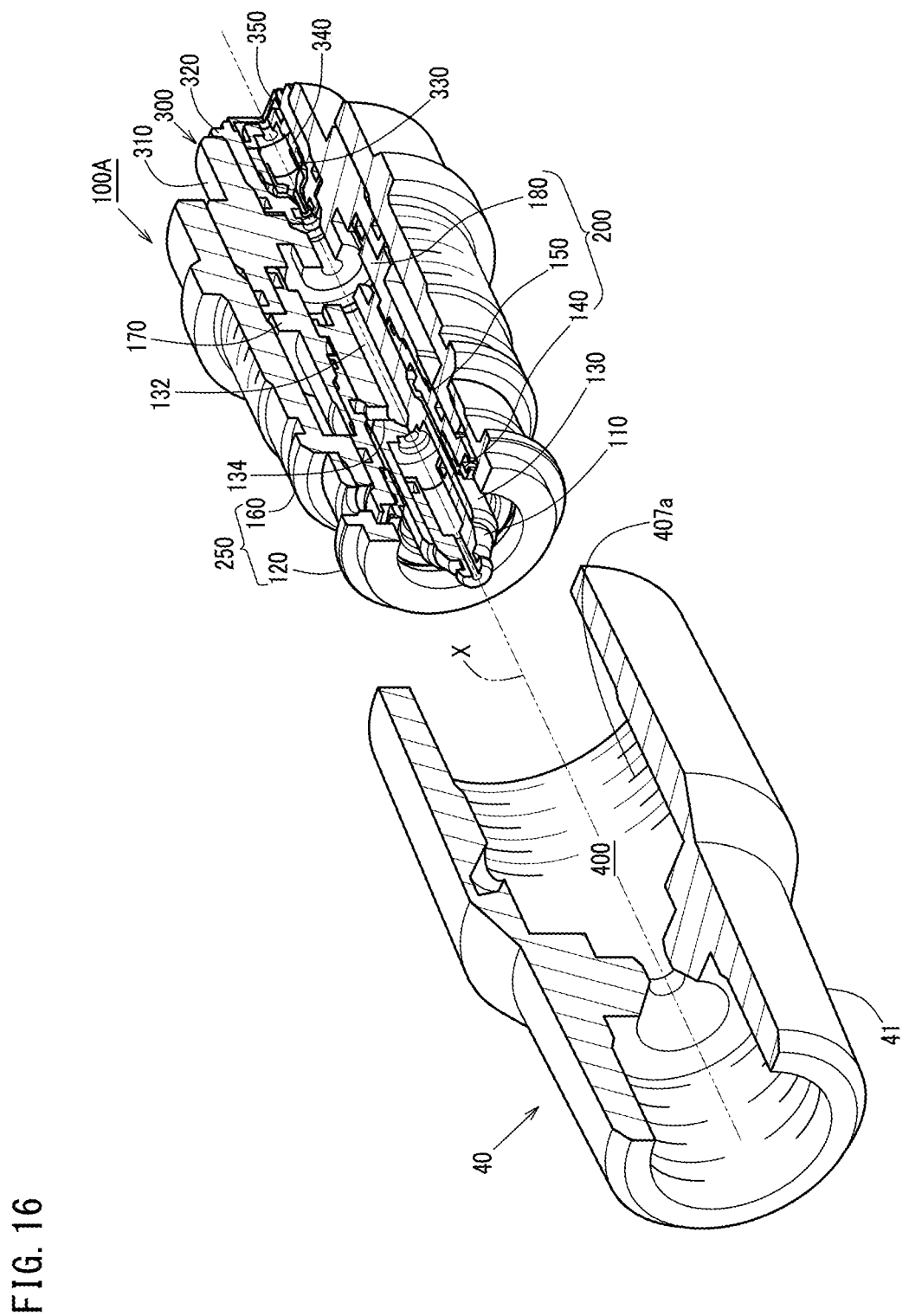
FIG. 16 is an enlarged isometric showing how the another combination valve cassette is attached.

FIG. 12 is a cross-sectional view of the combination valve cassette 100A including the safety valve mechanism 300. FIG. 13 is an exploded cross-sectional view of the safety valve mechanism 300. FIG. 14 is an exploded isometric view of the combination valve cassette 100A. FIG. 15 is an enlarged cross-sectional view showing how the combination valve cassette 100A is attached to the outlet 40. FIG. 16 is an enlarged isometric showing how the combination valve cassette 100A is attached to the outlet 40. FIG. 17 through FIG. 19 each show the combination valve cassette 100A.

Figure 18A:
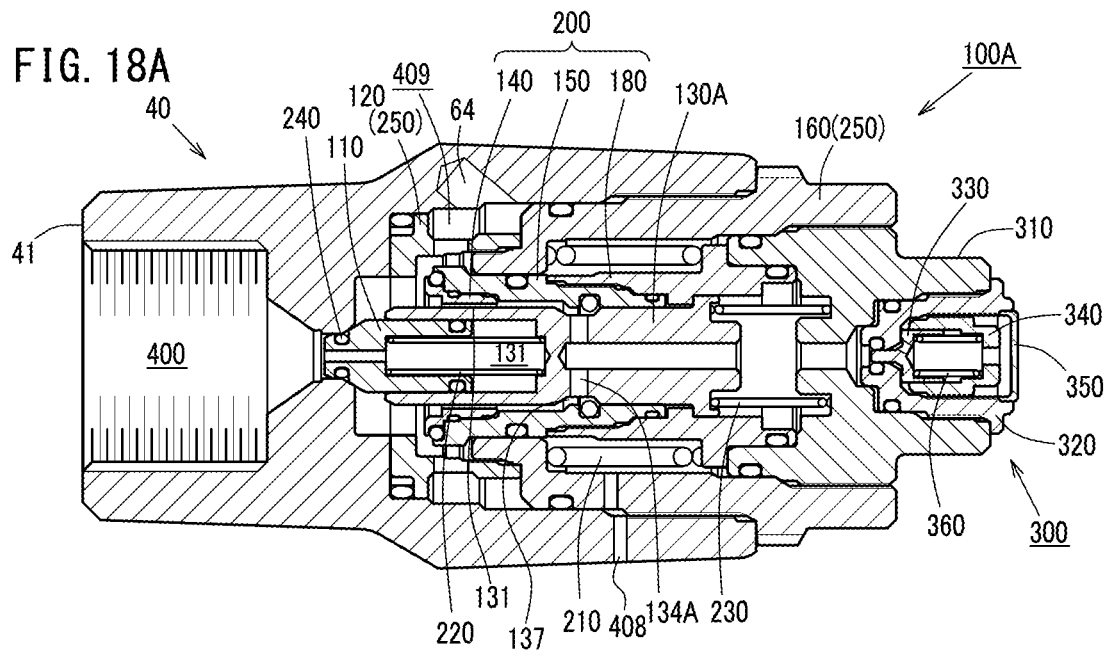
FIGS. 18A and 18B show the another combination valve cassette.
Figure 18B:
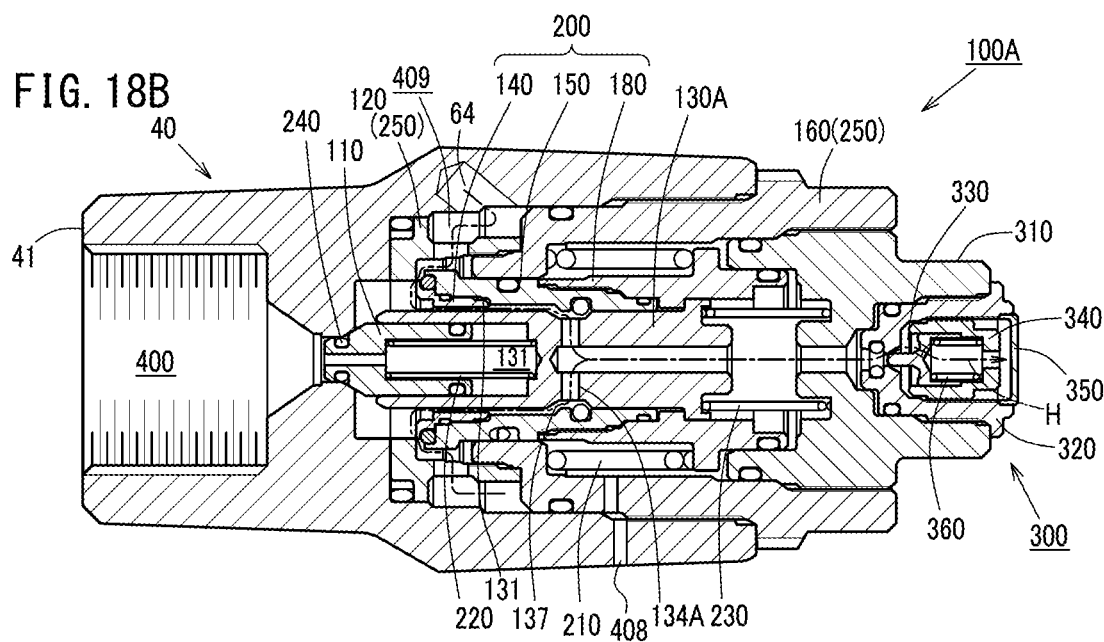
Figure 19A:
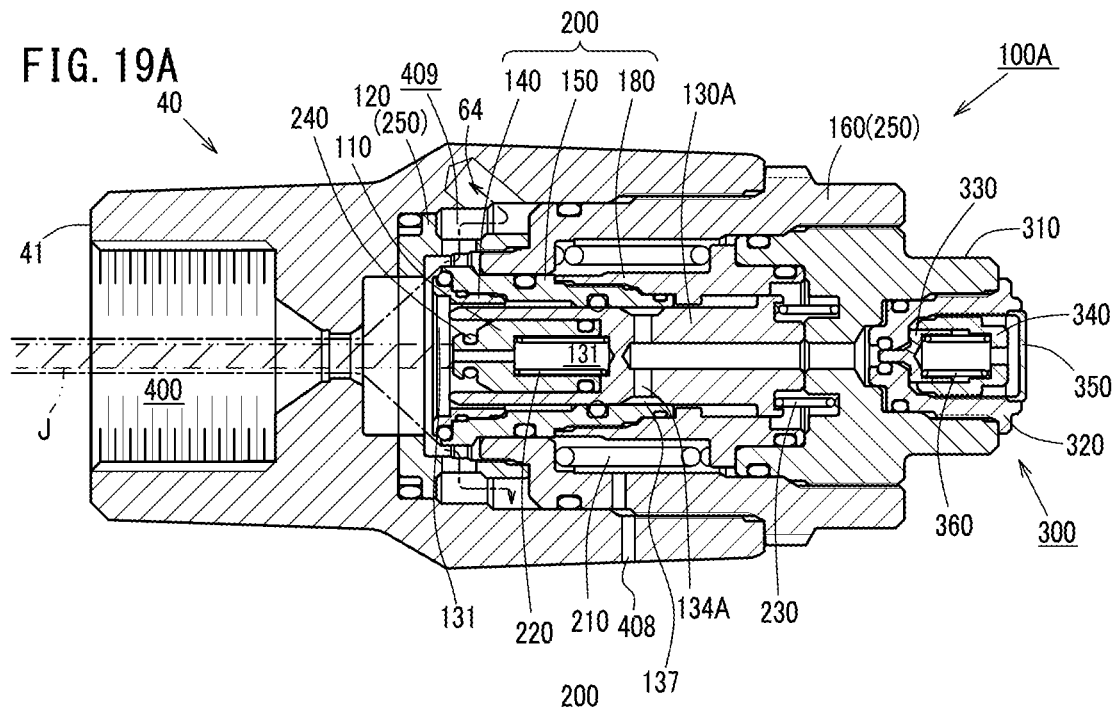
FIGS. 19A and 19B show the another combination valve cassette.
Figure 19B:
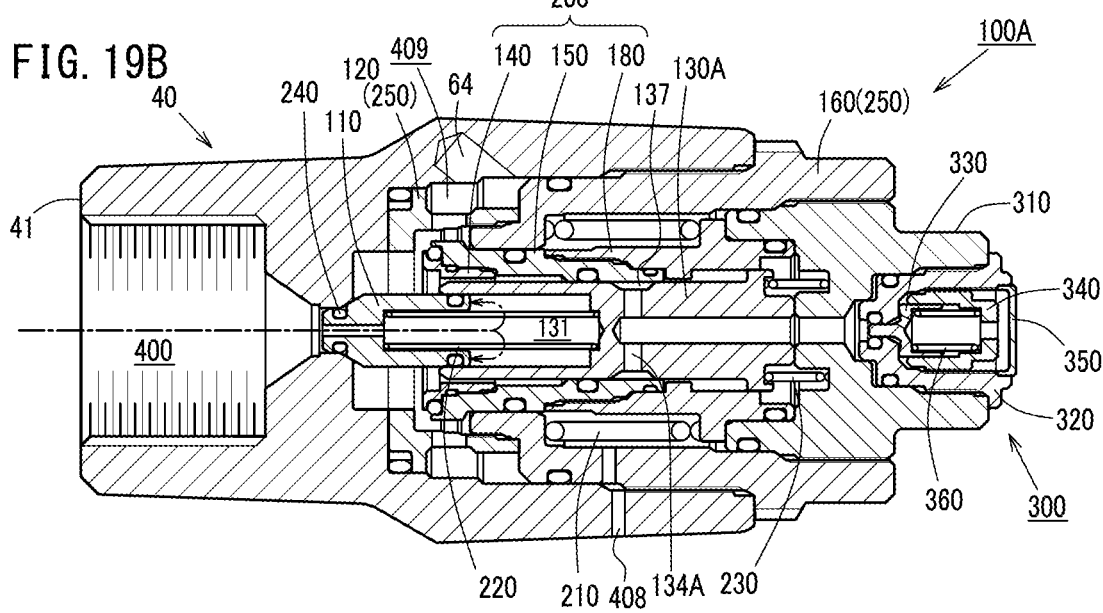

In more detail, FIG. 17A is a cross-sectional view of the combination valve cassette 100A in a normal gas consumption state (first predetermined pressure Fp≤primary side pressure P1), and FIG. 17B is a cross-sectional view of the combination valve cassette 100A in a gas consumption state where the primary side pressure P1 is low (second predetermined pressure Sp≤primary side pressure P1<first predetermined pressure Fp). FIG. 18A is a cross-sectional view of the combination valve cassette 100A in a residual pressure retaining state (primary side pressure P1<second predetermined pressure Sp), and FIG. 18B is a cross-sectional view of the combination valve cassette 100A in a state where a safety valve is actuated. FIG. 19A is a cross-sectional view of the combination valve cassette 100A in a full state, and FIG. 19B is a cross-sectional view of the combination valve cassette 100A in a state where a back pressure acts inadvertently.

In FIG. 13, FIG. 14 and FIG. 16, the O-rings 240, the first coil spring 210, the second coil spring 220 and the third coil spring 230 are not shown.

The combination valve cassette 100A including the safety valve mechanism 300 is different from the combination valve cassette 100 described above in including the safety valve mechanism 300 instead of the relief valve cylinder 170, in including a valve lid 310 instead of the valve lid 190, in not including the excessive pressure flow path 185 in the valve box 180, and not including the seal recessed portion 133 in a check valve retaining cylinder 130A. Except for the above, the combination valve cassette 100A is the same as the combination valve cassette 100 described above. The same components will bear the same reference signs and descriptions thereof will be omitted.

This will be described more specifically. The check valve retaining cylinder 130A does not include the seal recessed portion 133, which is included in the check valve retaining cylinder 130. The check valve retaining cylinder 130A includes, to the front of the inner flow space 132, a communication flow paths 134A communicating the outside of the check valve retaining cylinder 130A and the inner flow space 132 to each other in the diametric direction, instead of the communication flow paths 134 communicating the outside of the check valve retaining cylinder 130 and the inner flow space 132 to each other in an inclining manner. The check valve retaining cylinder 130A has, in an outer circumferential surface thereof, an outer circumferential surface groove 137 bridging over an end of the communication flow paths 134A. Except for the above, the check valve retaining cylinder 130A is the same as the communication flow paths 134, and the descriptions of the same components will be omitted.

As shown in FIG. 13, and FIG. 14, the safety valve mechanism 300, which is to be attached to the above-described position of the valve lid 190, includes the valve lid 310, a relief valve main body 320, a poppet 330, and a rear support 340, which are located in this order from the front to the rear.

The valve lid 310 includes a front body portion 311 attachable to the seventh space 407 described above, and a rear body portion 312 having a diameter shorter than that of the front body portion 311 and located to the rear of the front body portion 311. The front body portion 311 and the rear body portion 312 form a stepped shape. The valve lid 310 includes an insertion recessed portion 313 in a front part thereof. The insertion recessed portion 313 allows a rear end of the check valve retaining cylinder 130A to be inserted thereinto. The rear body portion 312 has a fitting space 316 formed therein. The fitting space 316 is open rearward and allows the relief valve main body 320 described below to fit thereinto. The insertion recessed portion 313 and the fitting space 316 are in communication with each other via a short diameter flow path 315 in the axial direction X.

The valve lid 310 has a ring groove 314 formed in a diametrically outward with respect to the short diameter flow path 315. The ring groove 314 is recessed rearward and allows a rear part of the third coil spring 230 to fit thereinto. The front body portion 311 has an O-ring groove 317 in an outer circumferential surface of a front part thereof. The O-ring groove 317 allows the O-ring 240 to fit thereinto.

The front body portion 311 has a thread 318 formed in an outer surface of a rear part thereof. The thread 318 is engageable with the screw groove 162*a* formed in the inner surface of the rear body portion 162. The rear body portion 312 has a screw groove 319 formed in an inner surface of a rear part thereof. The screw groove 319 is engageable with a thread 323 formed in an outer circumferential surface of the relief valve main body 320 fit into the fitting space 320.

The relief valve main body 320 is cylindrical and is to fit into the fitting space 316 of the valve lid 310. The relief valve main body 320 has the thread 323 formed in the outer circumferential surface thereof. The thread 323 is engageable with the screw groove 319 formed in the inner surface of the rear body portion 312.

The relief valve main body 320 has a through-hole 325 having a screw groove 322 formed in an inner circumferential surface thereof. The screw groove 322 is engageable with a thread 342 formed in an outer circumferential surface of the rear support 340 described below. The relief valve main body 320 also includes a front protrusion 321 having a short diameter and protruding forward.

The through-hole 325 is allowed to accommodate the rear support 340 described below, and has a tapered tip end having a diameter substantially equal to that of a protrusion 332 of the poppet 330 described below, such that the protrusion 332 is insertable into the front protrusion 321. The relief valve main body 320 has an O-ring fitting groove 324 formed in an outer circumferential surface of a front part thereof. The O-ring fitting groove 324 allows the O-ring to fit thereinto.

The relief valve main body 320 includes a protector attachment portion 328 at a rear end thereof. A protector 350 described below is insertable into the protector attachment portion 328 so as to be inscribed thereto.

The poppet 330 includes a cylindrical body portion 331 having a closed front end and a bottom surface, and the protrusion 332 protruding forward from a center of a front surface of the body portion 331.

The body portion 331 has a space 334 allowing a coil spring 360 to be located therein and open rearward. The body portion 331 has a flow inlet opening 333 at a base of the protrusion 332. The flow inlet opening 333 communicates the outside of the body portion 331 and the space 334 to each other.

The rear support 340 is cylindrical and has a bottom surface. The rear support 340 is to fit into the through-hole 325 of the relief valve main body 320 so as to close a rear end of the relief valve main body 320. The rear support 340 has a space 341 allowing the coil spring 360 (see FIG. 12) to be located therein and supporting the coil spring 360. The rear support 340 has the thread 342 formed in the outer circumferential surface thereof. The thread 342 is engageable with the screw groove 322 formed in the inner surface of the relief valve main body 320. The rear support 340 includes a sealing portion 343 sealing a rear end surface thereof.

The space 341 is open forward and has such a diameter that allows the body portion 331 of the poppet 330 to be inserted thereinto. The sealing portion 343 has a rear through-hole 344 running rearward from the space 341.

The coil spring 360 is located so as to extend through the space 334 of the poppet 330, having the body portion 331 thereof inserted into the spaced 341, and the space 341 of the rear support 340.

In the state where the safety valve mechanism 300 having such a structure is assembled, the rear support 340 inserted into the through-hole 325 and the relief valve main body 320 are integrated together via the engagement of the screw groove 322 and the thread 342. The poppet 330 having the body portion 331 thereof inserted into the space 341 is slidable forward and rearward with respect to the rear support 340 while being urged forward by the coil spring 360 located in, and supported by, the space 341.

The protector 350 is attached to the protector attachment portion 328 in the safety valve mechanism 300 having such a structure, and prevents entrance of moisture or unnecessary substances to the inside of the combination valve cassette 100A. The protector 350 is formed of a resin and is attached to be inscribed to the protector attachment portion 328.

The safety valve mechanism 300 is thus assembled. The thread 318 of the valve lid 310 of the safety valve mechanism 300 is put into engagement with the screw groove 162a of the valve cylinder 160 to attach the valve lid 310 to the inside of the rear body portion 162. Thus, the safety valve mechanism 300 is assembled with the combination valve cassette 100A.

The combination valve cassette 100A including the safety valve mechanism 300 has substantially the same structure as that of the combination valve cassette 100 described above except for the relief valve cylinder 170, the check valve retaining cylinder 130A and the valve lid 190. Therefore, in the normal gas release state shown in FIG. 17A, FIG. 17B and FIG. 18A, the gas flows substantially as described above although the gas induction passage H passes the communication flow paths 134A via the outer circumferential surface groove 137.

The combination valve cassette 100A including the safety valve mechanism 300 operates as follows when the gas acted on by an excessive pressure flows into the combination valve cassette 100A or when the pressure of the gas in the combination valve cassette 100A becomes excessive. As shown in FIG. 18B, the gas flowing to a position to the rear of the check valve retaining cylinder 130A via the gas induction passage H passes the short diameter flow path 315 and flows into the safety valve mechanism 300.

When the gas acted on by the excessive pressure flows into the safety valve mechanism 300, the poppet 330 is moved rearward against the spring force of the coil spring 360 from a state where the protrusion 332 is inserted into a front part of the through-hole 325 and seals the through-hole 325. The gas flowing into the safety valve mechanism 300 passes the flow inlet opening 333 of the poppet 330, which has been moved rearward such that the protrusion 332 is pulled out rearward, and, via the space 341 and the rear through-hole 344, acts on the protector 350 attached to the protector attachment portion 328. The protector 350, acted on by the pressure of the gas, comes off, and the gas acted on by the excessive pressure flows outside of the combination valve cassette 100A via the rear through-hole 344.

The combination valve cassette 100A may be supplied with the gas as follows. As shown in FIG. 19A, the check valve 110 and the check valve retaining cylinder 130A are moved rearward by the filling jig J represented by the one-dot chain line. Then, the outer circumferential surface groove 137 of the check valve retaining cylinder 130A is attached to an inner surface of the pressure decreasing piston 150, and thus is located to the rear of the O-ring 240 acting between the inner surface of the pressure decreasing piston 150 and the outer surface of the check valve retaining cylinder 130A. Therefore, the gas induction passage H passing the communication flow paths 134A via the outer circumferential surface groove 137 is blocked by the O-ring 240. The first space 401 of the in-outlet secondary side flow path 400 and the container valve 1 are in direct communication with each other by the filling jig J. The gas supplied from the filling device (not shown) connected with the connection permission portion 41 is provided to fill the cylinder container via the flow path 60.

The first space 401 of the in-outlet secondary side flow path 400 and the container valve 1 are in direct communication with each other by the filling jig J. Therefore, the pressure inside the container valve 1 in a filled state may be measured or components of the gas filling the cylinder container may be analyzed directly from the first space with no use of any special jig. Since the first space 401 of the in-outlet secondary side flow path 400 and the container valve 1 are in direct communication with each other by the filling jig J, the gas in the cylinder valve 1 may be absorbed to provide a vacuum state or entirely released, from the first space 401.

Even in the case where an inadvertent excessive pressure in an opposite direction (hereinafter, referred to as a "back pressure") acts on the combination valve cassette 100A from the first space 401, as shown in FIG. 19B, the back pressure moves rearward the check valve retaining cylinder 130A against the spring force of the third coil spring 230. Therefore, as described above, the outer circumferential surface groove 137 of the check valve retaining cylinder 130A is attached to the inner surface of the pressure decreasing piston 150, and thus is located to the rear of the O-ring 240 acting between the inner surface of the pressure decreasing piston 150 and the outer surface of the check valve retaining cylinder 130A. Therefore, the gas induction passage H passing the communication flow paths 134A via the outer circumferential surface groove 137 is blocked by the O-ring 240. The gas acted on by the back pressure passes the axial direction through-hole 115 of the check valve 110 and flows into the accommodation space 131 of the check valve retaining cylinder 130A. The back pressure acts on the check valve 110 and presses the check valve 110 forward. Thus, the check valve 110 acts as a one-way valve and prevents the gas from flowing into the combination valve cassette 100A and also prevents the gas acted on by the back pressure from acting on the safety valve mechanism 300.

In the above-described combination valve cassette 100A including the safety valve mechanism 300, the check valve retaining cylinder 130A having the inner flow space 132 formed therein is used to form the gas induction passage H, like the check valve retaining cylinder 130 of the combination valve cassette 100 not including the safety valve mechanism 300. As shown in FIG. 20 through FIG. 26, it is not absolutely necessary to form the inner flow space 132 in the check valve retaining cylinder. As shown in FIG. 20C, which is a cross-sectional view, or FIG. 21, more specifically, the enlarged view of part "a" in FIG. 21, a check valve retaining cylinder 130B having an outer circumferential surface axial direction slit 136 formed in an outer circumferential surface thereof and extending rearward may be used.

Figure 21:
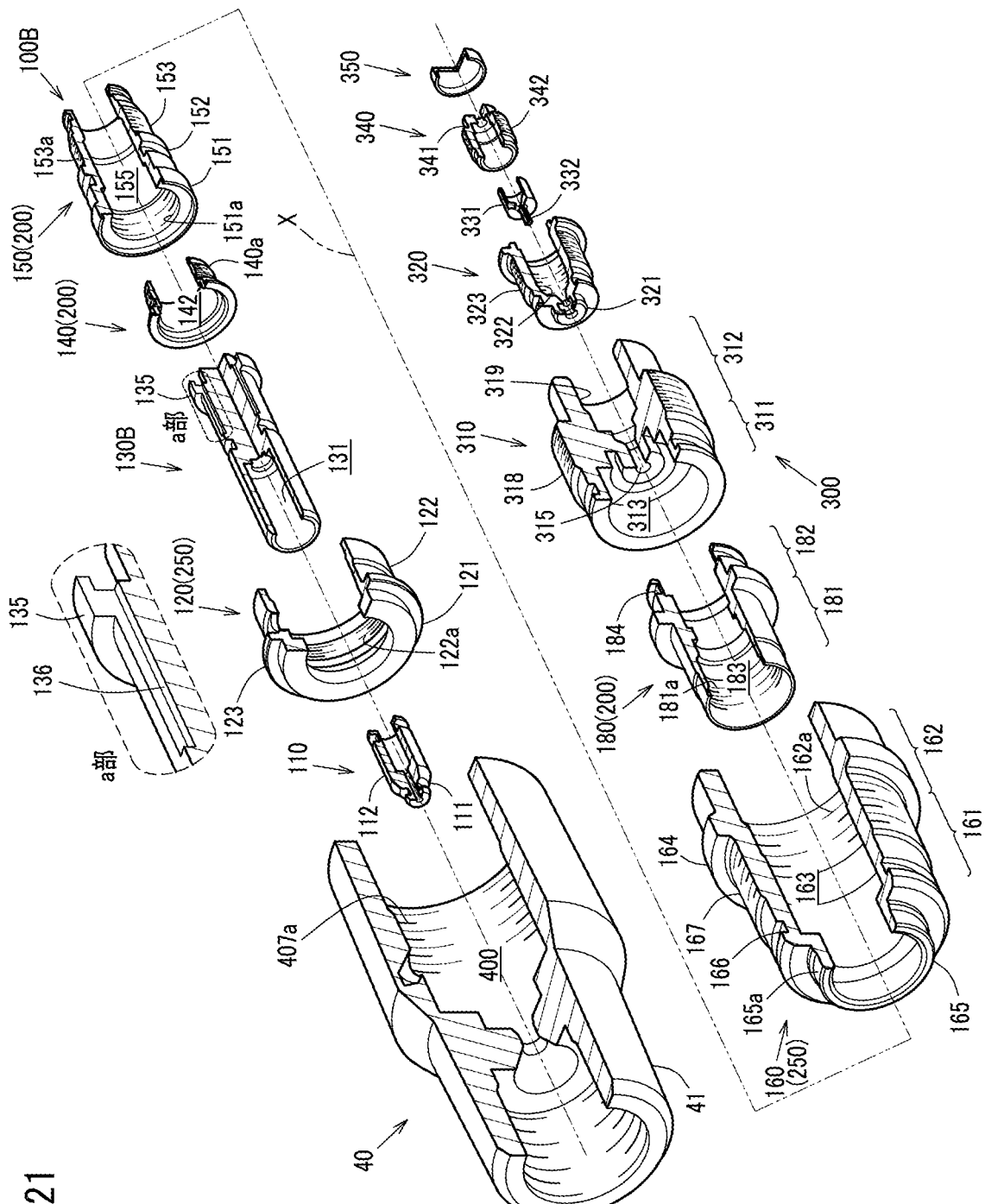
FIG. 21 is an exploded isometric view of the still another combination valve cassette.
Figure 22:
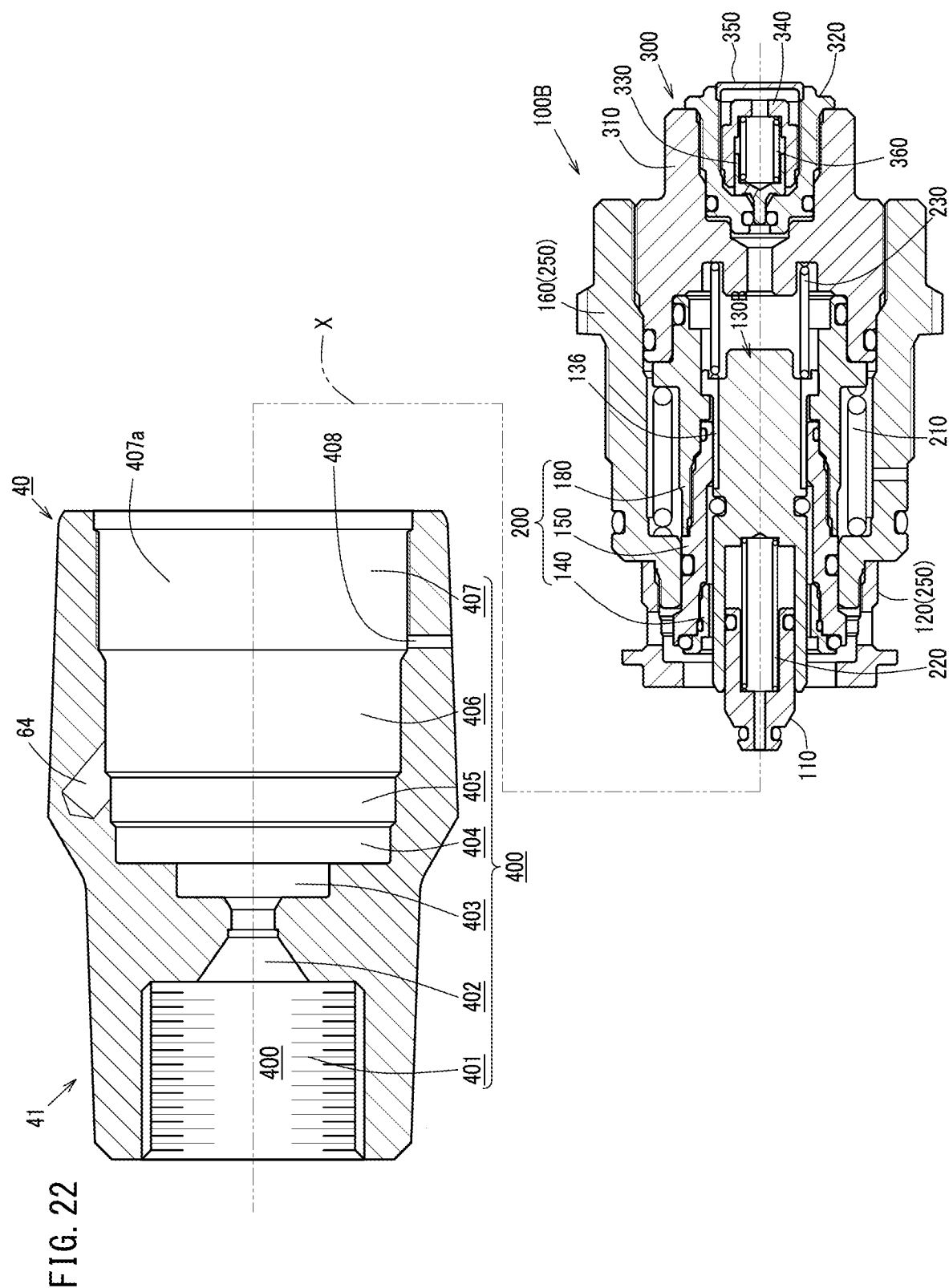
FIG. 22 is an enlarged cross-sectional view showing how the still another combination valve cassette is attached.
Figure 23:
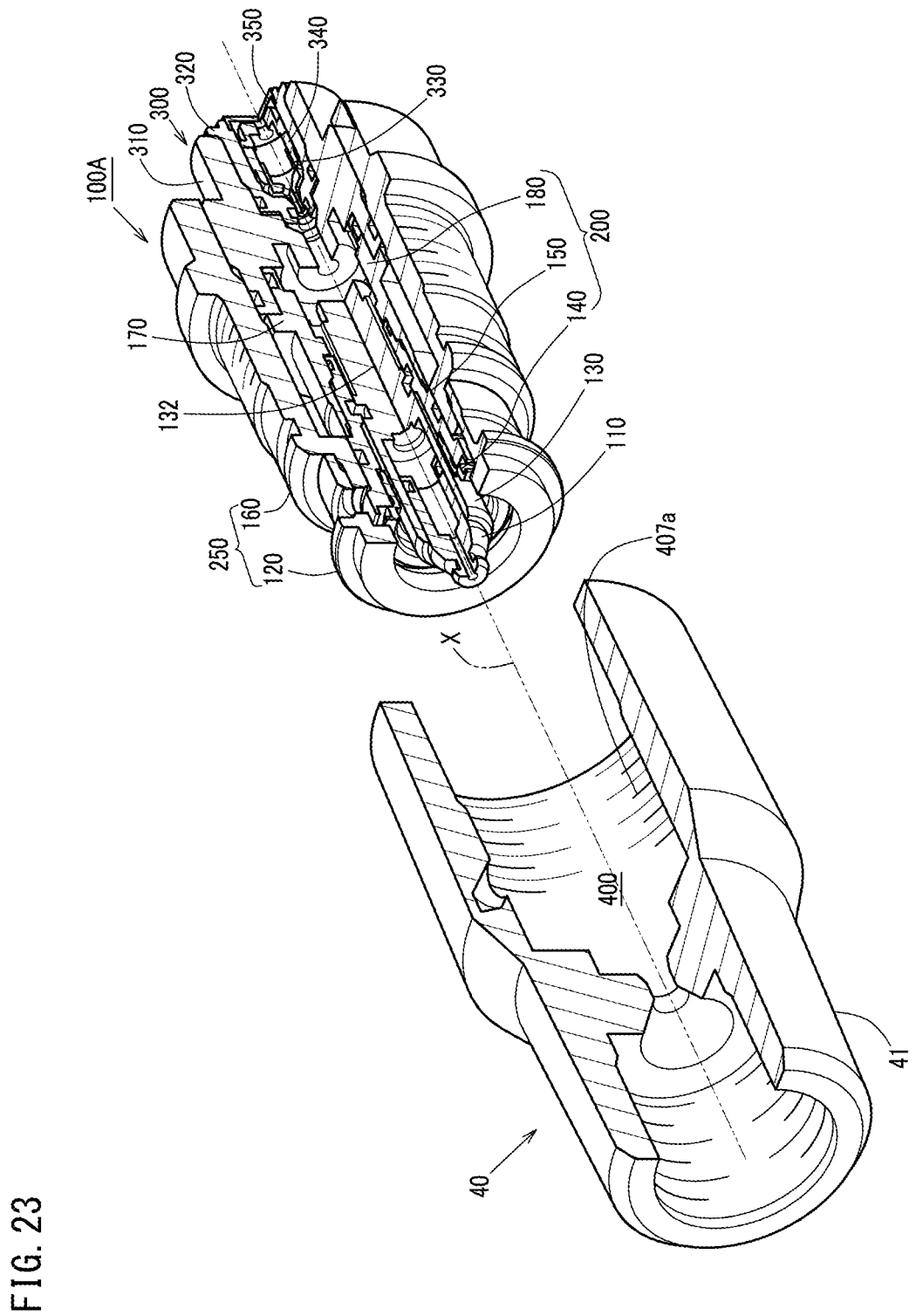
FIG. 23 is an enlarged isometric view showing how the still another combination valve cassette is attached.
Figure 24A:
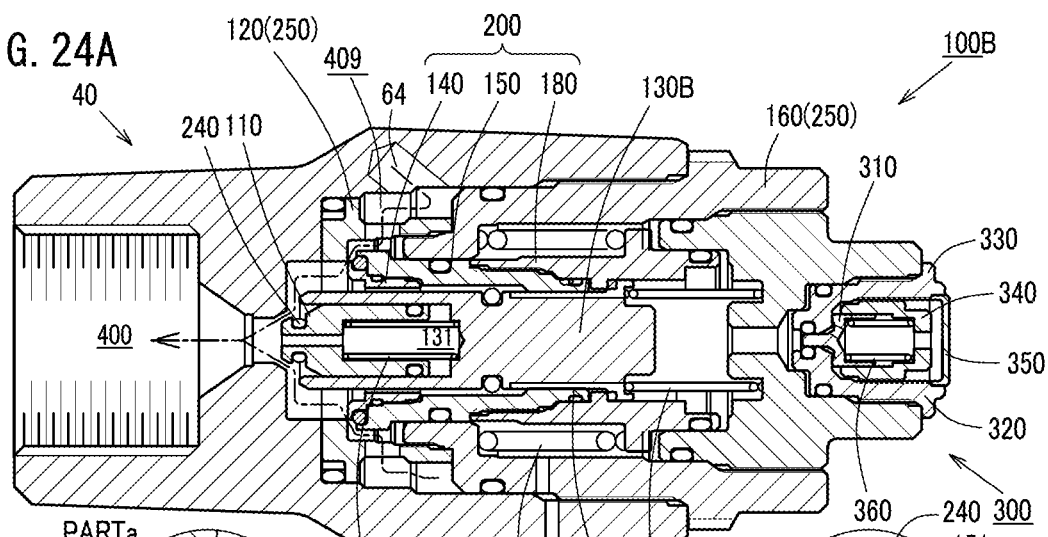
FIGS. 24A and 24B show the still another combination valve cassette.
Figure 24B:
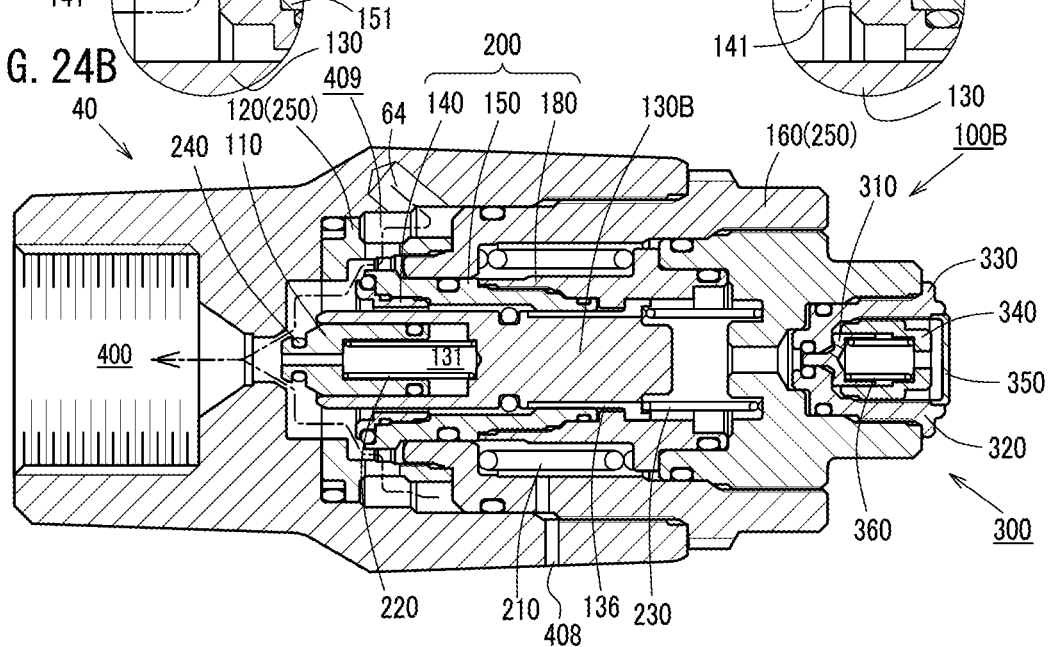
Figure 25A:
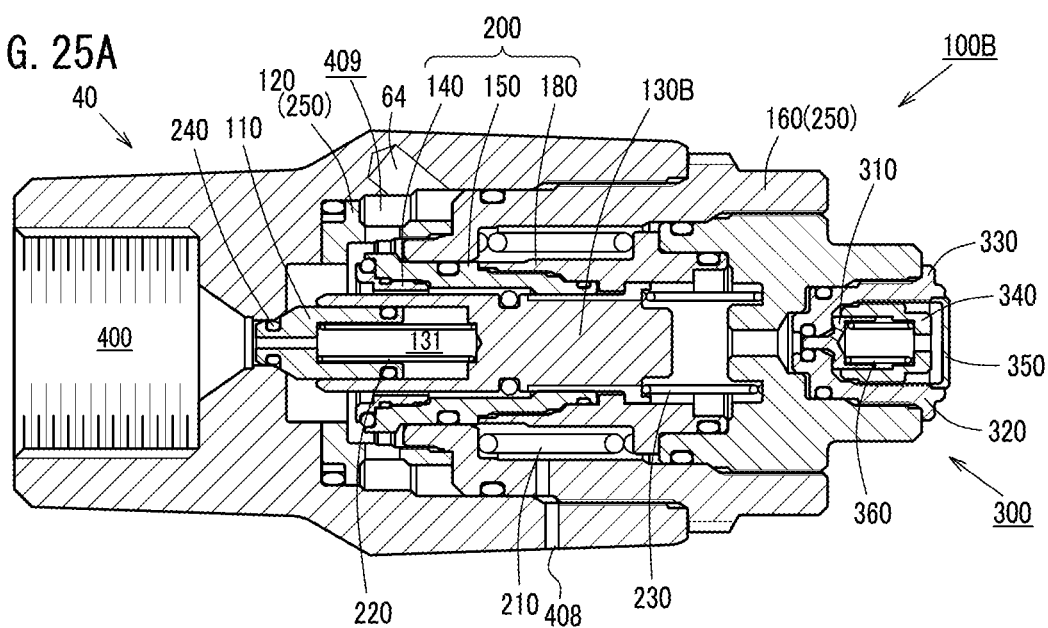
FIGS. 25A and 25B show the still another combination valve cassette.
Figure 25B:
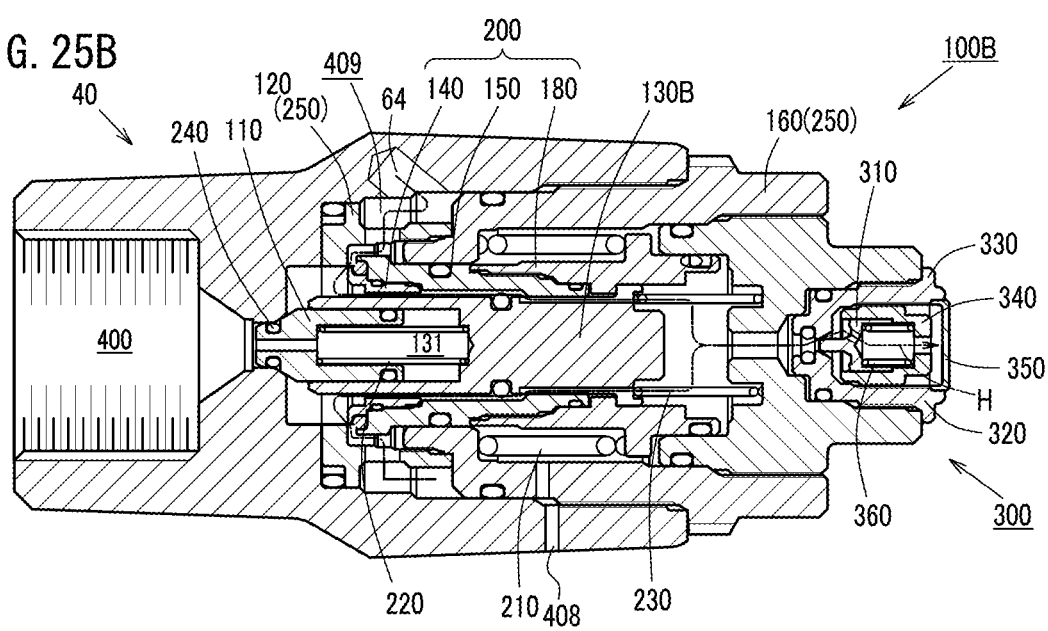
Figure 26A:
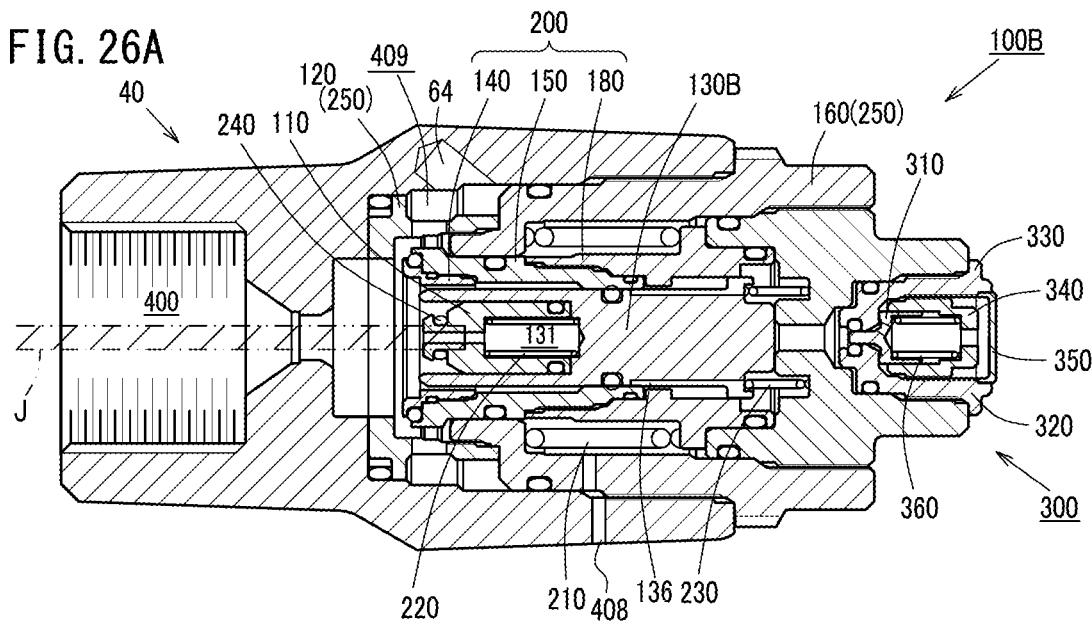
FIGS. 26A and 26B show the still another combination valve cassette.
Figure 26B:
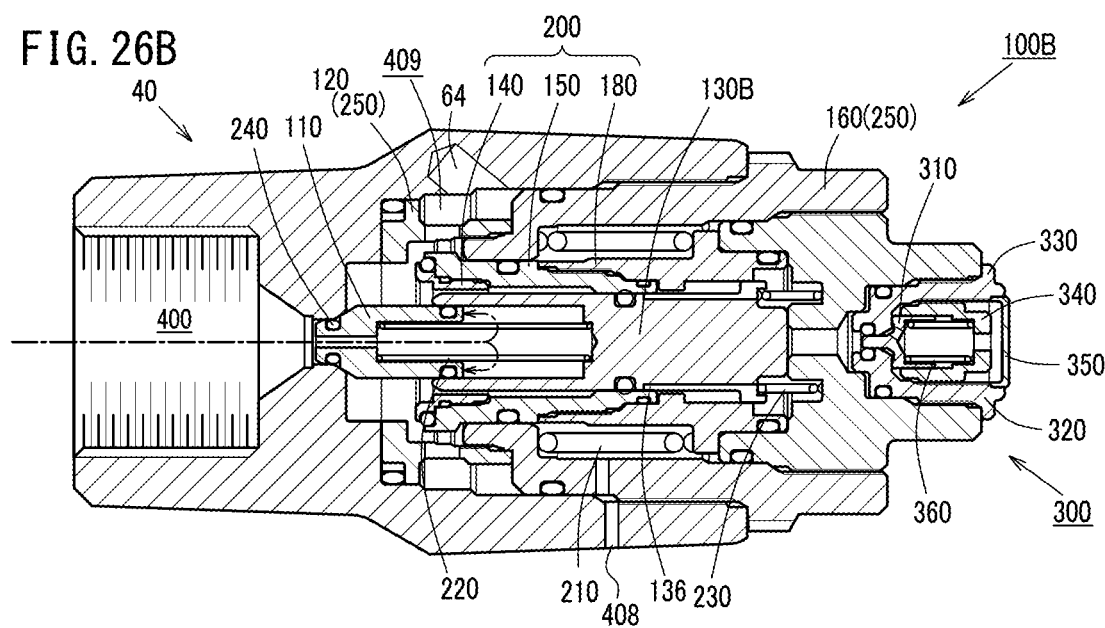

In FIG. 21 and FIG. 23, the O-rings 240, the first coil spring 210, the second coil spring 220 and the third coil spring 230 are not shown.

In a combination valve cassette 100B including the check valve retaining cylinder 130B, the gas induction passage H is set to pass the outer circumferential surface axial direction slit 136, instead of the inner flow space 132 of the check valve retaining cylinder 130. The combination valve cassette 100B has substantially the same structure, and operates in substantially the same manner, as that of the combination valve cassette 100A including the safety valve mechanism 300, and thus will not be described in detail.

The container valve 1 attachable to the cylinder container has the following structure. The combination valve cassette 100, 100A or 100B preventing gas from flowing in an unintended direction is attached to the in-outlet secondary side flow path 400 formed in the flow path 60, on the side of the outlet 40 with respect to the intermediate transmission member 54. The combination valve cassette 100, 100A or 100B includes the pressure decreasing valve assembly 200 that is located to be freely advance or retract to a first valve close position or a first valve open position in the in-outlet secondary side flow path 400 and retracts toward the first valve open position by the pressure of the gas flowing in the flow path 60; the first coil spring 210 urging the pressure decreasing valve assembly 200 in a retracting direction from the first valve close position toward the first valve open position; the check valve 110 that is located to freely advance or retract to a second valve close position or a second valve open position with respect to the pressure decreasing valve assembly 200 and retracts toward the second valve open position by the pressure of the gas; and the second coil spring 220 urging the check valve 110 in an advancing direction from the second valve open position toward the second valve close position. In the combination valve cassette 100, 100A or 100B, the gas induction passage H is formed that causes the gas of a predetermined pressure to flow to act on the pressure decreasing valve assembly 200 such that the pressure decreasing valve assembly 200 moves in the advancing direction from the first valve open position toward the first valve close position. Thus, the container valve 1 is compact and guarantees that the gas flows out at a sufficient flow rate even when the pressure of the gas is close to a predetermined level at which the pressure is to be retained.

This will be described in more detail. The combination valve cassette 100, 100A or 100B is attached to the in-outlet secondary side flow path 400 formed in the flow path 60, on the side of the outlet 40 with respect to the intermediate transmission member 54. The combination valve cassette 100, 100A or 100B includes the pressure decreasing valve assembly 200, the first coil spring 210, the check valve 110 and the second coil spring 220. In the combination valve cassette 100, 100A or 100B, the gas induction passage H is formed that causes the gas of a predetermined pressure to flow to act on the pressure decreasing valve assembly 200 such that the pressure decreasing valve assembly 200 moves in the advancing direction from the first valve open position toward the first valve close position. With such an arrangement, if the primary side pressure P1 is higher than, or equal to, a predetermined pressure, the gas flows while the pressure thereof is adjusted by the pressure decreasing valve assembly 200 by the balance of the pressure of the gas flowing in the gas induction passage H and the spring force of the first spring 210. Therefore, the combination valve cassette 100, 100A or 100B acts as a pressure decreasing valve mechanism in which the secondary side pressure P2 is made lower than the primary side pressure P1. Thus the gas is allowed to flow in the state where the pressure thereof is decreased.

The pressure decreasing valve assembly 200 retracts toward the first valve open position by the pressure of the gas, and the first spring 210 urges the pressure decreasing valve assembly 200 in the retracting direction from the first valve close position (sealing position; see the enlarged view of part "a" in FIG. 8) toward the first valve open position (see the enlarged view of part "b" in FIG. 8). Therefore, the container valve 1 of a low pressure open type is provided, in which the gas flows in the gas induction passage H, the primary side pressure P1 acting on the pressure decreasing valve assembly 200 is decreased, and the pressure decreasing valve assembly 200 is opened in a low pressure state having a predetermined low pressure. In such a low pressure state, the pressure decreasing valve assembly 200 is opened, and thus a sufficient flow rate of the gas is guaranteed to flow out.

The combination valve cassette 100, 100A or 100B includes the check valve 110 that is located to freely advance or retract to the second valve close position or the second valve open position with respect to the pressure decreasing valve assembly 200 and retracts toward the second valve open position by the pressure of gas; and the second coil spring 220 urging the check valve 110 in the advancing direction from the second valve open position toward the second valve close position. With such an arrangement, the gas of a predetermined pressure is allowed to remain without the gas filling the cylinder container being entirely released. Since the gas of the predetermined pressure remains, the predetermined pressure acts on the inside the cylinder container by the remaining gas. Thus, an unintended flow of the gas into the cylinder container is prevented.

The container valve 1 having the above-described pressure decreasing valve mechanism and the safety valve mechanism is structured to be compact.

The check valve retaining cylinder 130 includes the accommodation space 131 in an advancing-side part thereof. The accommodation space 131 accommodates the check valve 110 such that the check valve 110 freely advances and retracts, and is open in the advancing side. The accommodation space 131 accommodates the second coil spring 320 urging the check valve 110 toward the advancing side by use of the check valve retaining cylinder 130 as a counterforce, and also accommodates the check valve 110. Therefore, unlike in the case where the check valve 110 and the check valve retaining cylinder 130 are separated from each other, the check valve 110 and the second coil spring 220 are accommodated in the accommodation space 131 formed in the advancing-side part of the check valve retaining cylinder 130. Thus, the container valve 1 is made more compact.

The first spring 210 has a spring force that moves the pressure decreasing valve assembly 200 to the valve open position against a pressure, higher than, or equal to, the first predetermined pressure Fp, of the gas passing the gas induction passage H and acting on the pressure decreasing valve assembly 200. The second coil spring 220 has a spring force that moves the check valve 110 to the valve close position against a pressure, higher than, or equal to, the second predetermined pressure Sp, of the gas remaining in the cylinder container when the gas is released via the flow path 60. The spring force of the first coil spring 210 is higher than the spring force of the second coil spring 220. Therefore, the compact container valve 1 is provided with certainty in which the pressure is decreased certainly in a high pressure state where the primary side pressure P1 is high and a sufficient flow rate of gas is guaranteed in a low pressure state where the primary side pressure P1 is low.

The combination valve cassette 100 includes the excessive pressure flow-out path 408 connected with a middle part of the gas induction passage H and communicated with the outside of the combination valve cassette 100, the relief valve cylinder 170 located to be freely advance or retract to a third valve close position or a third valve open position, and the first coil spring 210 having a spring force that urges the relief valve cylinder 170 toward the third valve close position and allows the relief valve cylinder 170 to move toward the third valve open position by the pressure of the gas flowing in the gas induction passage H. The pressure of the gas flowing in the gas induction passage H is higher than a safety valve actuation pressure (third predetermined pressure) that is that set higher than the pressure of use. With such an arrangement, even when gas acted on by an excessive pressure exceeding the predetermined pressure flows, such gas acted on by the excessive pressure is released safely.

This will be described in more detail. In the combination valve cassette 100, when the relief valve cylinder 170 is actuated by the action of the excessive pressure exceeding the predetermined pressure, a release path in the housing is opened to allow the gas to flow therein. Therefore, the gas acted on by the excessive pressure is released from the opening at the open end of the release path.

The combination valve cassette 100 or the container valve 1, in which the pressure decreasing valve assembly 200, the check valve 110 and the relief valve cylinder 170 advance or retract in the axial direction X, is made more compact than a combination valve cassette or a container valve in which a pressure decreasing valve assembly, a check valve and a relief valve cylinder does not advance or retract in the axial direction X.

This will be described more specifically. The pressure decreasing valve assembly 200, the check valve 110, the check valve retaining cylinder 130 and the like, which are movable components of the combination valve cassette 100, are configured to be movable in the axial direction X. In addition, the check valve 110 is accommodated in the accommodation space 131 of the check valve retaining cylinder 130, and the relief valve cylinder 170 is outserted onto the pressure decreasing valve assembly 200. These components are located in the cassette frame 250, which is attached to one connection permission portion 41. Therefore, the combination valve cassette 100 or the container valve is made compact.

The first coil spring 210 urges rearward the pressure decreasing valve assembly 200 and also the relief valve cylinder 170 outserted onto the valve box 180 included in the pressure decreasing valve assembly 200. Thus, the first coil spring 210 act both as an urging portion that closes the relief valve cylinder 170 and an urging portion urges the pressure decreasing valve assembly 200 to the valve open position at a rear position. Therefore, the number of components is decreased. In addition, as compared with the case where an urging portion that closes the relief valve cylinder 170 and an urging portion urges the pressure decreasing valve assembly 200 to the valve open position at a rear position are separately provided, the required space is decreased. Thus, the combination valve cassette 100 or the container valve 1 is made more compact.

The first spring 210 urges rearward the pressure decreasing valve assembly 200 via the relief valve cylinder 170. Therefore, in the case where the relief valve cylinder 170 acts as the safety valve mechanism, gas acted on by a pressure higher than, or equal to, the first predetermined pressure Fp passes the gas induction passage H and attempts to seal the pressure decreasing valve assembly 200 at a front position. From this state, the gas is further acted on by a pressure higher than, or equal to, a set pressure (third predetermined pressure) at which the safety valve mechanism is actuated, and such gas moves forward only the relief valve cylinder 170. As a result, the relief valve cylinder 170 and the excessive pressure flow-out path 408 are communicated with each other. Thus, the gas having the excessive pressure is allowed to flow out via the excessive pressure flow-out path 408.

The seal recessed portion 133 of the check valve retaining cylinder 130 and the seal cylinder 191 of the valve lid 190 are put into engagement with each other to block the gas induction passage H to prevent the gas from flowing in a filling direction. Therefore, even in the case where the cylinder container is filled with gas of a high pressure that is higher than the pressure at which the relief valve cylinder 170 or the safety valve mechanism 300 is actuated, the seal recessed portion 133 of the check valve retaining cylinder 130 and the seal cylinder 191 of the valve lid 190 are put into engagement with each other to block the gas induction passage H. Therefore, the relief valve cylinder 170 does not act unnecessarily, and the cylinder container is filled with the gas with certainty. The pressure at which the relief valve cylinder 170 or the safety valve mechanism 300 is actuated is higher than the secondary side pressure P2, which is close to the pressure of use.

In the case where neither the seal recessed portion 133 of the check valve retaining cylinder 130 nor the seal cylinder 191 of the valve lid 190 is provided, the relief valve cylinder 170 located in the gas induction passage H is actuated by the filling pressure. Therefore, a route for providing gas to fill the cylinder container needs to be provided separately from the gas induction passage H. By contrast, in this embodiment, since the seal recessed portion 133 of the check valve retaining cylinder 130 and the seal cylinder 191 of the valve lid 190 are put into engagement with each other to block the gas induction passage H, the relief valve cylinder 170 is not actuated by the filling pressure. Thus, one opening is usable as a gas filling opening and a gas releasing opening. Namely, filling with gas and gas releasing are performed via one connection permission portion 41 of the outlet 40. Thus, the container valve 1 is made compact. The cylinder container having such a compact container valve 1 attached thereto requires merely a small accommodation space for a container cap and is easier to handle than in the case where a large container valve is attached.

The fluid according to the present invention corresponds to gas in the above-described embodiment; and similarly, the open/close valve corresponds to the intermediate transmission member 54;

the valve device corresponds to the container valve 1;

the flow direction restriction valve mechanism unit and the flow direction restriction valve mechanism each correspond to the combination valve cassette 100, 100A and 100B;

the restriction valve space corresponds to the in-outlet secondary side flow path 400;

the first flow direction restriction valve corresponds to the pressure decreasing valve assembly 200;

the first urging portion corresponds to the first coil spring 210;

the second flow direction restriction valve corresponds to the check valve 110;

the second urging portion corresponds to the second coil spring 220;

the acting gas flow path corresponds to the gas induction passage H;

the safety flow path corresponds to the excessive pressure flow-out path 408;

the safety valve corresponds to the relief valve cylinder 170 or the safety valve mechanism 300;

the third urging portion corresponds to the first coil spring 210 urging the relief valve cylinder 170 or the coil spring 360 of the safety valve mechanism 300;

the coaxial direction corresponds to the axial direction X; and the block unit corresponds to the engagement of the seal recessed portion 133 of the check valve retaining cylinder 130 and the seal cylinder 191 of the valve lid 190.

However, the present invention is not limited to the above-described embodiment, and may be carried out in any of many embodiments.

For example, in the above-described example, gas is used as the fluid. Alternatively, the fluid may be liquid or gel.

The combination valve cassette 100, 100A or 100B described above has a cassette structure including the cassette frame 250 using the circular flow path formation ring 120 and the valve cylinder 160 as the outer shell. Alternatively, the combination valve cassette 100, 100A or 100B may not include the cassette frame 250 including the circular flow path formation ring 120 and the valve cylinder 160, and any other component included in the combination valve cassette 100, 100A or 100B may be attached to the in-outlet secondary side flow path 400 of the outlet 40.

In the above-described example, the combination valve cassette 100, 100A or 100B is attached to the in-outlet secondary side flow path 400 of the container valve 1. Alternatively, the combination valve cassette 100, 100A or 100B may be attached to a pipe valve that is attached to a pipe. Even in this case, the combination valve cassette 100, 100A or 100B may have a cassette structure including the cassette frame 250 using the circular flow path formation ring 120 and the valve cylinder 160 as the outer shell and may be easily assembled to a main body of the pipe valve. Alternatively, the combination valve cassette 100, 100A or 100B used in the container valve 1 may be used for a pipe valve. The combination valve cassette 100, 100A or 100B, in the case of having a cassette structure, may be attached to any of various types of container valve or pipe valve to broaden the range of uses thereof.

REFERENCE SIGNS LIST

1 . . . Container valve
40 . . . Outlet
54 . . . Intermediate transmission member 54
60 . . . Flow path
100, 100A, 100B . . . Combination valve cassette
110 . . . Check valve
130, 130A, 130B . . . Check valve retaining cylinder
131 . . . Accommodation space
170 . . . Relief valve cylinder
190 . . . Valve lid
191 . . . Seal cylinder
200 . . . Pressure decreasing valve assembly
210 . . . First coil spring
220 . . . Second coil spring
250 . . . Cassette frame
300 . . . Safety valve mechanism
360 . . . Coil spring
400 . . . In-outlet secondary side flow path
408 . . . Excessive pressure flow-out path
H . . . Gas induction passage
X . . . Axial direction

The invention claimed is:

1. A flow direction restriction valve mechanism unit with a valve device, wherein the flow direction restriction valve mechanism unit is attachable to the valve device, the valve device including an acting gas flow path in which a fluid passes and an open/close valve switching an open state to a close state or vice versa in the acting gas flow path, the flow direction restriction valve mechanism unit being attachable by insertion into and detachable from the valve device, the flow direction restriction valve mechanism unit with the valve device being configured to prevent the fluid from flowing in an unintended direction, and the valve device comprising a connection permission portion, and the flow direction restriction valve mechanism unit comprising:

a first flow direction restriction valve that is located to be linearly advanceable to a first valve close position and linearly retractable to a first valve open position, wherein the first flow direction restriction valve retracts toward the first valve open position by a spring force from a first urging portion and advances toward the first valve close position by a pressure of the fluid flowing in the acting gas flow path;

a second flow direction restriction valve that is located to be linearly advanceable to a second valve close position and linearly retractable to a second valve open position, wherein the second flow direction restriction valve retracts toward the second valve open position by the pressure of the fluid flowing in the acting gas flow path;

a safety valve; and a valve cylinder connected with the connection permission portion in a manner that the connection permission portion caps a part of the valve cylinder, wherein the valve cylinder accommodates the first direction restriction valve and the second flow direction restriction valve, the valve cylinder comprising a first safety flow path that is connected with the acting gas flow path when the safety valve is open, wherein the connection permission portion comprises a second safety flow path that is in communication with the outside of the flow direction restriction valve mechanism unit;

wherein the safety valve is located to be linearly advanceable to a third valve open position at which the acting gas flow path, the first safety flow path, and the second safety flow path are in communication with each other and to be linearly retractable to a third valve close position at which the acting gas flow path is not in communication with the first safety flow path and the second safety flow path;

wherein, when the pressure of the fluid flowing in the acting gas flow path is higher than or equal to a first predetermined pressure, the pressure of the fluid moves the first flow direction restriction valve from the first valve open position toward the first valve close position against the urging of the first urging portion;

wherein the second flow direction restriction valve comprises a second urging portion having a spring force that urges the second flow direction restriction valve in a valve closing direction from the second valve open position toward the second valve close position;

wherein, when the pressure of the fluid flowing in the acting gas flow path is higher than or equal to a second predetermined pressure which is lower than the first predetermined pressure, the pressure of the fluid moves the second flow direction restriction valve from the second valve close position toward the second valve open position against the urging of the second urging portion;

wherein the safety valve comprises a third urging portion having a spring force that urges the safety valve in a valve closing direction from the third valve open position toward the third valve close position;

wherein, when the pressure of the fluid flowing in the acting gas flow path is higher than or equal to a third predetermined pressure which is higher than the first predetermined pressure, the pressure of the fluid is transmitted through an excessive pressure flow path to the safety valve and moves the safety valve from third valve close position toward the third valve open position against the urging of the third urging portion, such that the safety valve is moved with respect to the first flow direction restriction valve, to form a gap between the safety valve and the first flow direction restriction valve, thereby allowing the fluid to flow through the excessive pressure flow path, flow through the gap, flow through the first safety flow path, and flow through the second safety flow path in order, to be released to the outside;

wherein the excessive pressure flow path is configured to pass through the first flow direction restriction valve; and wherein the first flow direction restriction valve, the second flow direction restriction valve and the safety valve advance and retract coaxially.

2. The flow direction restriction valve mechanism unit with the valve device according to claim 1, wherein the first urging portion also acts as the third urging portion.

3. The flow direction restriction valve mechanism unit with the valve device according to claim 1, further comprising a block unit which blocks the acting gas flow path by coaxial engagement to prevent the fluid from flowing in a filling direction.

4. The flow direction restriction valve mechanism unit with the valve device according to claim 1, further comprising an accommodating space on an advancing side with respect to the first flow direction restriction valve, the accommodating space being open on the advancing side and accommodating the second flow direction restriction valve such that the second flow direction restriction valve is allowed to freely advance or retract;

wherein the accommodating space accommodates the second urging portion urging the second flow direction restriction valve toward the advancing side by use of the first flow direction restriction valve as a counterforce.

5. The flow direction restriction valve mechanism unit with the valve device according to claim 1, wherein, when the pressure of the fluid flowing in the acting gas flow path is lower than the third predetermined pressure, the safety valve and the first flow direction restriction valve are movable together with no gap therebetween.

* * * * *